(12) United States Patent
Etori

(10) Patent No.: US 7,926,998 B2
(45) Date of Patent: Apr. 19, 2011

(54) LIGHT CONTROL FILM AND BACKLIGHT UNIT USING THE SAME

(75) Inventor: Hideki Etori, Saitama-shi (JP)

(73) Assignee: Kimoto Co., Ltd. (JP)

( * ) Notice: Subject to any disclaimer, the term of this patent is extended or adjusted under 35 U.S.C. 154(b) by 1203 days.

(21) Appl. No.: 10/591,396

(22) PCT Filed: Mar. 2, 2005

(86) PCT No.: PCT/JP2005/003530
§ 371 (c)(1),
(2), (4) Date: Sep. 1, 2006

(87) PCT Pub. No.: WO2005/085915
PCT Pub. Date: Sep. 15, 2005

(65) Prior Publication Data
US 2007/0182882 A1 Aug. 9, 2007

(30) Foreign Application Priority Data

Mar. 3, 2004 (JP) .................................. 2004-059604
Mar. 3, 2004 (JP) .................................. 2004-059605
Mar. 3, 2004 (JP) .................................. 2004-059606

(51) Int. Cl.
*F21V 5/00* (2006.01)

(52) U.S. Cl. ...................................... 362/606; 362/618

(58) Field of Classification Search .................. 362/606, 362/618, 331; 359/559
See application file for complete search history.

(56) References Cited

U.S. PATENT DOCUMENTS

| | | | | |
|---|---|---|---|---|
| 5,552,907 A * | 9/1996 | Yokota et al. | ..................... | 349/62 |
| 5,944,405 A | 8/1999 | Takeuchi et al. | ................. | 362/31 |
| 5,995,288 A | 11/1999 | Kashima et al. | ............... | 359/559 |
| 6,846,098 B2 * | 1/2005 | Bourdelais et al. | ........... | 362/330 |
| 6,913,365 B2 * | 7/2005 | Masaki et al. | ................. | 362/627 |
| 7,712,932 B2 * | 5/2010 | Parker et al. | .................. | 362/337 |
| 2003/0038911 A1 | 2/2003 | Tanada | ......................... | 349/117 |

FOREIGN PATENT DOCUMENTS

| | | |
|---|---|---|
| JP | 09-127314 | 5/1997 |
| JP | 11-095013 | 4/1999 |
| JP | 2000-48613 | 2/2000 |
| JP | 2002-182017 | 6/2002 |
| JP | 2002-260424 | 9/2002 |
| JP | 2002-328209 | 11/2002 |
| JP | 2003-203514 | 7/2003 |
| JP | 2004-37520 | 2/2004 |
| WO | 03/044572 | 5/2003 |

* cited by examiner

*Primary Examiner* — Stephen F. Husar
*Assistant Examiner* — Peggy A. Neils
(74) *Attorney, Agent, or Firm* — Bacon & Thomas, PLLC

(57) ABSTRACT

A light control film providing improved n front luminance and appropriate light diffusion, without problems of interference pattern, glare etc., has a rough surface constituted so that, for a curved surface portion of the rough surface, having an approximately square area of 1 mm² or larger and defined at an arbitrary position on the rough surface by using data for heights of the rough surface measured at predetermined intervals in the longitudinal and transverse directions, an average of slopes of the curved surface portion ($\theta_{nv}$ degrees) of the rough surface, with respect to a base plane of the film, should be not less than 27 degrees and not more than 70 degrees at substantially any position on the light control film.

16 Claims, 8 Drawing Sheets

(a)

(b)

(c)

Fig.1
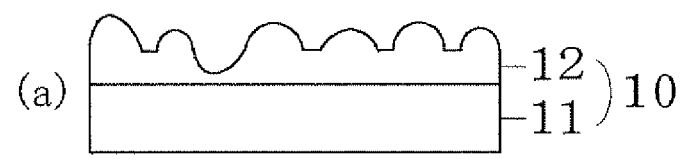
(a)
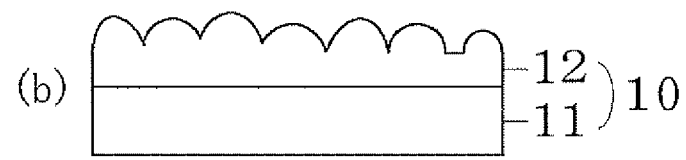
(b)
(c)
Fig.2-1
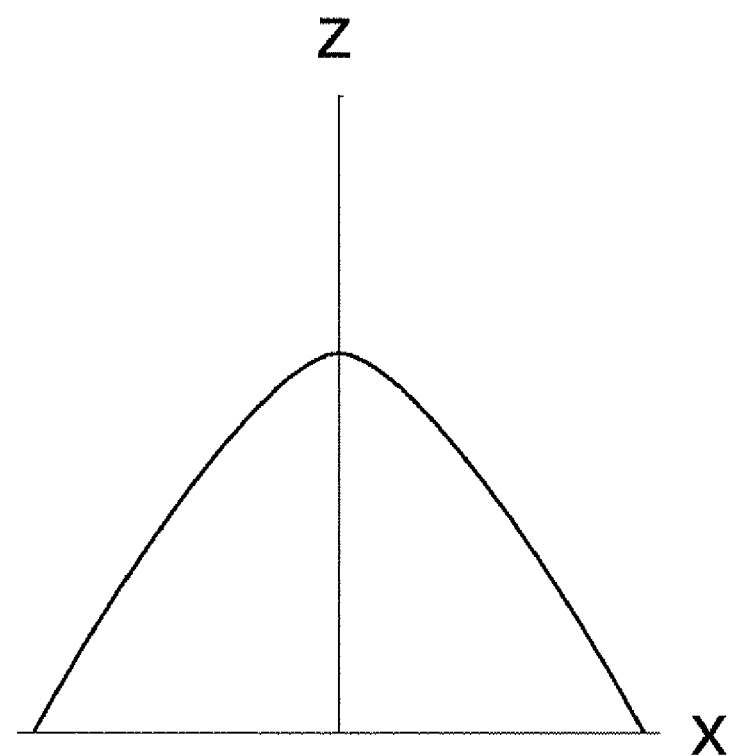

LIGHT CONTROL FILM AND BACKLIGHT UNIT USING THE SAME

CROSS-REFERENCE RELATED TO APPLICATION

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON COMPACT DISC

Not applicable

BACKGROUND OF THE INVENTION

1. Field of the Invention

The present invention relates to a light control film used for backlight units such as those for liquid crystal displays and so forth, and a backlight unit using the same.

2. Description of Related Art

For liquid crystal displays and so forth, backlight units of the edge light type or direct type are conventionally used. Since backlight units of the edge light type can be manufactured with a small thickness, they are used for notebook computers etc., whereas backlight units of the direct type are used for large-sized liquid crystal television, etc.

Light emitted from these conventional backlight units includes components projected along directions significantly inclined from the front direction. Light emitted from backlight units of the edge light type, in particular, contains a lot of components projected along directions significantly inclined from the front direction, and thus it is difficult to obtain high front luminance.

In the conventional backlight units, two or more optical films such as prism sheets and light diffusive films are used in combination in order to improve front luminance so that the light is directed to the front. See, for example, claim 1 and [0034] of Japanese Kokai 9-127314.

Although prism sheets can generally increase the ratio of light emerging in the front direction (the direction perpendicular to the film surface) by surface design based on geometric optics. However, they have drawbacks in that they are likely to create an interference pattern due to regularly arranged convex portions, and in that they cause glare if they are used alone and thus they impair visibility of the image. Moreover, they unduly concentrate light in the front direction, and therefore they cannot provide a wide viewing angle.

On the other hand, if diffusion films are used alone, the front luminance becomes insufficient, although the aforementioned problems are avoided.

In the technique disclosed in Japanese Kokai 9-127314, a prism sheet and a light diffusive film are used in combination. However, the front luminance enhanced by the prism sheet is reduced by the use of the light diffusive film. Moreover, the films in layers may create Newton rings between the layers. Further, scratches and so forth may be caused by the contact of the films.

SUMMARY OF THE INVENTION

Therefore, an object of the present invention is to provide a light control film that reliably improves front luminance when it is used alone or in combination with a prism sheet, provides appropriate light diffusion, and does not suffer from the problems of interference pattern and glare, and a backlight unit using the same.

In order to achieve the aforementioned objectives, the present invention improves the front luminance by appropriately setting the slopes of the curved surfaces constituting the rough surface, with respect to the base plane, and thereby efficiently directs light entered into the film to the front (projection direction).

More specifically, the present invention provides superior front luminance by setting the average ($\theta_{nv}$ (degree)) of slopes of the curved surfaces of the rough surface, with respect to the standard surface (the surface opposite the surface on which convexoconcaves are formed), which slopes are henceforth referred to as "slopes of a curved surface", obtained for an area of a particular size or larger (1 mm$^2$ or larger), within a predetermined range.

If the average of slopes of the curved surface ($\theta_{nv}$ (degree)) is used as an index of slope of the rough surface, and a ratio of an area (A1) of an approximately square region on the rough surface (area of orthogonal projection of the rough surface) and a surface area (A2) of a curved surface constituting the rough surface ($A_r$=A2/A1) is used as an index of height of convexoconcaves, the relationships of these indexes to change of front luminance can be mathematically expressed (as relational equations), and when the values of the indexes were within specific ranges, superior front luminance is achieved.

The light control film according to a first embodiment of the present invention is a light control film having a rough surface, wherein, for a curved surface of the rough surface in an approximately square area of 1 mm$^2$ or larger, defined at an arbitrary position on the rough surface by using heights of the rough surface measured at predetermined intervals in the longitudinal and transverse directions in the approximately square area, an average of slopes of the curved surface $\theta_{nv}$ in(degrees) of the rough surface with respect to a base plane of the film is not less than 27 degrees and not more than 70 degrees at substantially any position on the light control film. Thus, the first embodiment satisfies a "condition 1" wherein $\theta_{nv}$ is not less than 27 degrees and not more than 70 degrees.

The light control film according to the second embodiment of the present invention is a light control film having a rough surface formed as a patterned layer comprising a material having a refractive index n, wherein, for a curved surface of the rough surface in an approximately square area of 1 mm$^2$ or larger, defined at an arbitrary position on the rough surface by using heights of the rough surface measured at predetermined intervals in the longitudinal and transverse directions in the approximately square area, an average of slopes of the curved surface ($\theta_{nv}$ (degree)) of the rough surface with respect to a base plane of the film is not less than (59−20n) degrees and not more than 70 degrees at any position on the light control film. Thus the second embodiment satisfies a "condition 2" wherein $\theta_{nv}$ is not less than (59−20n) degrees and not more than 70 degrees.

The light control film according to the third embodiment of the present invention is a light control film having a rough surface, wherein, for a curved surface of the rough surface in an approximately square area of 1 mm$^2$ or larger, defined at an arbitrary position on the rough surface by using heights of the rough surface measured at predetermined intervals in the longitudinal and transverse directions in the approximately square region, an average of slopes of the curved surface $\theta_{nv}$ (degrees) of the rough surface with respect to a base plane of the film and a ratio of an area of the approximately square region (A1) and a surface area of the approximated curved surface of the rough surface (A2) ($A_r$=A2/A1) satisfy the following equation (1) or (2) at substantially any position on the light control film. Thus, the third embodiment satisfies a third condition wherein "$\theta_{nv} \div A_r \geq 22$" or $30 \leq \theta_{nv} \times A_r \leq 140$.

$$\theta_{nv} \div A_r \geq 22 \quad (1)$$

$$30 \leq \theta_{nv} \times A_r \leq 140 \quad (2)$$

The light control film according to the fourth embodiment of the present invention is a light control film having a rough surface formed as a patterned layer comprising a material having a refractive index n, wherein, for a curved surface of the rough surface in an approximately square area of 1 mm² or larger, defined at an arbitrary position on the rough surface by using heights of the rough surface measured at predetermined intervals in the longitudinal and transverse directions in the approximately square region, an average of slopes of the curved surface $\theta_{nv}$ (degrees) of the rough surface with respect to a base plane of the film and a ratio of the approximately square area (A1) and a surface area of the approximated curved surface of the rough surface (A2) ($A_r$=A2/A1) satisfy the following equation (3) or (4) at substantially any position on the light control film. Thus, the fourth embodiment satisfies a "condition 4" wherein $\theta_{nv} \div A_r \times n^2 \geq 35$ or $60 \leq \theta_{nv} \times A_r \times n^2 \leq 350$.

$$\theta_{nv} \div A_r \times n^2 \geq 35 \quad (3)$$

$$60 \leq \theta_{nv} \times A_r \times n^2 \leq 350 \quad (4)$$

It has also been found that if the average $\theta_{nv}$ (degrees) of slopes of a curved surface of the rough surface with respect to the standard surface (the surface opposite the surface on which convexoconcaves are formed), which slopes are henceforth referred to as "slopes of a curved surface", obtained for an area of a particular size or larger (1 mm² or larger) is within a predetermined range, and a numerical value $A_{sk}$ [equation (5)], representing an index of asymmetry of a probability density function for the height direction obtained from all the surface height data for the aforementioned area, or a numerical value $A_{ku}$ [equation (6)] representing as an index of sharpness of the probability density function for the height direction obtained from all the surface height data is within a predetermined range, as defined in the fifth to eighth embodiments of the present invention, superior front luminance is achieved.

$$A_{sk} = \frac{\sum_{i=1}^{m} z_i^3}{m} \Big/ \sqrt{\frac{\sum_{i=1}^{m} z_i^2}{m}}^3 \quad (5)$$

In equation (5), $z_i$ represents a value obtained by subtracting a height of the average plane of the rough surface from a measured surface height, and m represents the number of measurement points.

$$A_{ku} = \frac{\sum_{i=1}^{m} z_i^4}{m} \Big/ \sqrt{\frac{\sum_{i=1}^{m} z_i^2}{m}}^4 \quad (6)$$

In equation (6), $z_i$ represents a value obtained by subtracting a height of average plane of the rough surface from a measured surface height, and m represents the number of measurement points.

The light control film according to the fifth embodiment of the present invention is a light control film having a rough surface that has, for a curved surface of the rough surface in an approximately square area of 1 mm² or larger, defined at an arbitrary position on the rough surface by using heights of the rough surface measured at predetermined intervals in the longitudinal and transverse directions in the approximately square area, an average of slopes of the curved surface $\theta_{nv}$ (degrees) of the rough surface with respect to a base plane of the film is not less than 27 degrees and not more than 70 degrees, and an absolute value of a numerical value ($A_{sk}$) calculated in accordance with the equation (5) by using all the heights of the rough surface, of not more than 1.2 at substantially any position on the light control film. Thus, the fifth embodiment satisfies a "condition 5" wherein $\theta_{nv}$ is not less than 27 degrees and not more than 70 degrees and an absolute value of $A_{sk}$ is not more than 1.2.

The light control film according to the sixth embodiment of the present invention is a light control film having a rough surface formed as a patterned layer comprising a material having a refractive index n, wherein, for a curved surface of the rough surface in an approximately square area of 1 mm² or larger, defined at an arbitrary position on the rough surface by using heights of the rough surface measured at predetermined intervals in the longitudinal and transverse directions in the approximately square area, an average of slopes of the curved surface $\theta_{nv}$ (degrees) of the rough surface with respect to a base plane of the film is not less than (59−20n) degrees and not more than 70 degrees, and an absolute value of a numerical value ($A_{sk}$), calculated in accordance with the equation (5) by using all the heights of the rough surface, is not more than 1.2 at substantially any position on the light control film. Thus, "condition 6" provides that $\theta_{nv}$ is not less than (59−20n) degrees and not more than 70 degrees and has an absolute value of $A_{sk}$ not more than 1.2.

The light control film according to the seventh embodiment of the present invention is a light control film having a rough surface, wherein a condition that, for a curved surface of the rough surface in an approximately square area of 1 mm² or larger, defined at an arbitrary position on the rough surface by using heights of the rough surface measured at predetermined intervals in the longitudinal and transverse directions in the approximately square area, an average of slopes of the curved surface $\theta_{nv}$ (degrees) of the rough surface with respect to a base plane of the film is not less than 27 degrees and not more than 70 degrees. Further, a numerical value ($A_{ku}$) calculated by using all the heights of the rough surface in accordance with the aforementioned equation (6) is not less than 1.5 and not more than 5.0 at substantially any position on the light control film. Thus, "condition 7" provides that $\theta_{nv}$ is not less than 27 degrees and not more than 70 degrees and $A_{ku}$ is not less than 1.5 and not more than 5.0.

The light control film according to the eighth embodiment of the present invention is a light control film having a rough surface formed by a patterned layer comprising a material having a refractive index n, wherein, for a curved surface of the rough surface in an approximately square area of 1 mm² or larger, defined at an arbitrary position on the rough surface by using heights of the rough surface measured at predetermined intervals in the longitudinal and transverse directions in the approximately square area, an average of slopes of the curved surface $\theta_{nv}$ (degrees) of the rough surface with respect to a base plane of the film is not less than (59−20n) degrees and not more than 70 degrees, and a numerical value ($A_{ku}$) calculated by using all the heights of the rough surface in accordance with the aforementioned equation (6) is not less than 1.5 and not more than 5.0 at substantially any position on the light control film. Thus, "condition 8" provides that $\theta_{nv}$ is not less than (59−20n) degrees and not more than 70 degrees and $A_{ku}$ is not less than 1.5 and not more than 5.0.

To achieve the aforementioned object, it has been found that if a ratio ($A_r$=A2/A1, referred to as a surface area ratio hereafter) of a surface area (A2) of a curved surface constituting the rough surface and an area (A1) of an approximately square area on the rough surface (area of orthogonal projection of the rough surface) is within a predetermined range, and a numerical value $A_{sk}$ [equation (5)] representing an index of asymmetry of a probability density function for the height direction obtained from all the surface height data for the area (A1), or a numerical value $A_{ku}$ [equation (6)] representing an index of sharpness of the probability density function for the height direction obtained from all the surface height data is within a predetermined range, as defined in the ninth to twelfth embodiments of the present invention, superior front luminance is achieved.

[#3]

$$A_{sk} = \frac{\sum_{i=1}^{m} z_i^3}{m} \bigg/ \sqrt{\frac{\sum_{i=1}^{m} z_i^2}{m}}^3 \quad (5)$$

In the equation (5), $z_i$ represents a value obtained by subtracting a height of average plane of the rough surface from a measured surface height, and m represents the number of measurement points.

[#4]

$$A_{ku} = \frac{\sum_{i=1}^{m} z_i^4}{m} \bigg/ \sqrt{\frac{\sum_{i=1}^{m} z_i^2}{m}}^4 \quad (6)$$

In the equation (6), $z_i$ represents a value obtained by subtracting a height of average plane of the rough surface from a measured surface height, and m represents the number of measurement points.

The light control film according to the ninth embodiment of the present invention is a light control film having a rough surface, wherein, for a curved surface of the rough surface in an approximately square area of 1 mm$^2$ or larger, defined at an arbitrary position on the rough surface by using heights of the rough surface measured at predetermined intervals in the longitudinal and transverse directions in the approximately square area, a ratio of an area of the approximately square area (A1) and a surface area of the approximated curved surface of the rough surface (A2) ($A_r$=A2/A1) is not less than 1.2 and not more than 2.5, and the absolute value of a numerical value ($A_{sk}$) calculated in accordance with the equation (5), by using all the heights of the rough surface, is not more than 1.2 at substantially any position on the light control film. Thus, "condition 9" provides that $A_r$ is not less than 1.2 and not more than 2.5 and an absolute value of $A_{sk}$ not more than 1.2.

The light control film according to the tenth embodiment of the present invention is a light control film having a rough surface formed by a patterned layer comprising a material having a refractive index n, wherein, for a curved surface area of the rough surface in an approximately square area of 1 mm$^2$ or larger, defined at an arbitrary position on the rough surface by using heights of the rough surface measured at predetermined intervals in the longitudinal and transverse directions in the approximately square area, a ratio of an area of the approximately square region (A1) and a surface area of the approximated curved surface of the rough surface (A2) ($A_r$=A2/A1) is not less than (2−0.5n) and not more than 2.5, the and absolute value of a numerical value ($A_{sk}$), calculated in accordance with the equation (5) by using all the heights of the rough surface, is not more than 1.2 at substantially any position on the light control film. Thus "condition 10" provides that $A_r$ is not less than (2−0.5n) and not more than 2.5 and an absolute value of $A_{sk}$ is not more than 1.2.

The light control film according to the eleventh embodiment of the present invention is a light control film having a rough surface, wherein, for a curved surface of the rough surface in an approximately square area of 1 mm$^2$ or larger, defined at an arbitrary position on the rough surface by using heights of the rough surface measured at predetermined intervals in the longitudinal and transverse directions in the approximately square area, a ratio of the approximately square area (A1) and a surface area of the approximated curved surface area of the rough surface (A2) ($A_r$=A2/A1) is not less than 1.2 and not more than 2.5, and a numerical value $A_{ku}$, calculated in accordance with the equation (6) mentioned above using all the surface height data, is not less than 1.5 and not more than 5.0, which condition is satisfied at substantially any position on the light control film. Thus, "condition 11" is satisfied by $A_r$ not less than 1.2 and not more than 2.5 and $A_{ku}$ not less than 1.5 and not more than 5.0.

The light control film according to the twelfth embodiment of the present invention is a light control film having a rough surface formed as a patterned layer comprising a material having a refractive index n, wherein, for a curved surface area of the rough surface in an approximately square area of 1 mm$^2$ or larger, defined at an arbitrary position on the rough surface by using heights of the rough surface measured at predetermined intervals in the longitudinal and transverse directions in the approximately square area, a ratio of an area of the approximately square area (A1) and a surface area of the approximated curved surface of the rough surface (A2) ($A_r$=A2/A1) is not less than (2−0.5n) and not more than 2.5, and a numerical value $A_{ku}$, calculated in accordance with the equation (6) mentioned above using all the surface height data, is not less than 1.5 and not more than 5.0 at substantially any position on the light control film. Thus, "condition 12" is satisfied by a value $A_r$ not less than (2−0.5n) and not more than 2.5 and a value $A_{ku}$ not less than 1.5 and not more than 5.0.

In the first to twelfth embodiments of the present invention, the approximately square area on the rough surface means an area of an orthogonal projection of the rough surface.

In the first to twelfth embodiments of the present invention, the base plane of the film means a plane of the film that is substantially planar, and when the face of the light control film of the present invention, opposite to the face on which convexoconcaves are formed, is smooth, the plane of this face can be regarded as the base plane. When the opposite face is not smooth but a rough surface, a plane including the central lines of two different directions thereof can be regarded as the base plane.

In the first to eighth embodiments of the present invention, the average of slopes of a curved surface $\theta_{nv}$ (degrees) is used. In general, if a curved surface area of a rough surface can be represented by a common function z=f(x, y), an average of slopes of the curved surface ($C_{fc}$) constituting the rough surface with respect to the aforementioned base plane can be represented by the following equation (7) wherein D is a region for which the average is calculated.

[#5]

$$C_{fc} = \int\int_D \left(\frac{\partial z}{\partial x} + \frac{\partial z}{\partial y}\right) dx dy \bigg/ \int\int_D dx dy \qquad (7)$$

Further, the average of slopes of the curved surface wherein the slopes are indicated by angle $\theta_{fc}$ (degrees) can be represented by the following equation (8).

[#6]

$$\theta_{fc} = \tan^{-1} C_{fc} \qquad (8)$$

However, although it is possible to use such a function for product designing, it is almost impossible to describe a rough surface with a general function for an actual product, and an average of slopes of a curved surface $\theta_{fc}$ (degrees) can hardly be obtained. Therefore, in the first to eighth embodiments of the present invention, a value calculated as follows is defined as an average of slopes of a curved surface $\theta_{nv}$ (degrees).

First, surface heights of a rough surface are measured by using a surface profiler at positions defined by dividing an approximately square area larger than a predetermined area (1 mm² or larger), at an arbitrary positions on the rough surface in a lattice pattern with predetermined intervals ($\Delta d_L$, $\Delta d_H$) for the longitudinal and transverse directions. When the surface height data for the approximately square area on the base plane are measured at points in numbers of r for the longitudinal direction and s for the transverse direction, the height data corresponds to those points in a number of (r×s), and the respective data points are represented as {($H_{11}$, $H_{12}$, $H_{13}$, ... $H_{1s}$), ($H_{21}$, $H_{22}$, $H_{23}$, ... $H_{2s}$), ... ($H_{r1}$, $H_{r2}$, $H_{r3}$, ... $H_{rs}$)}. The numbers of the measurement points for the longitudinal and transverse directions, r and s, may be the same or different, so long as the region is approximately square. Further, the measurement intervals for the longitudinal and transverse directions, $\Delta d_L$ and $\Delta d_H$, may also be the same or different.

Then, one diagonal line is drawn in each unit lattice having side lengths of $\Delta d_L$ and $\Delta d_H$ for the longitudinal and transverse directions, respectively, on the base plane to divide the lattice into two triangles. From height data at the three apexes of each of these two triangles on the base plane, "one triangle plane (henceforth referred to as "minute triangle plane")" is uniquely defined for each triangle on the base plane, and the slope of this minute triangle plane with respect to the base plane can be obtained by calculating the angle between the normal of the minute triangle plane and the normal of the base plane. If $\Delta d_L$ and $\Delta d_H$ are sufficiently small, the curved surface area constituting the rough surface is approximated by the planes of the minute triangles. Therefore, the average of slopes of the curved surface $\theta_{nv}$ (degrees) can be obtained by applying this method to all the unit lattices in the approximate square for which the height data are measured, to approximate the curved surface constituting the rough surface with planes of minute triangles, obtaining slopes of the minute triangle planes and averaging those slopes.

The lengths of the measurement intervals ($\Delta d_L$ and $\Delta d_H$) mentioned above are lengths that serve to correctly reflect the profile of the rough surface included in the measurement region, and both are about 1.0 μm or shorter.

On the other hand, in the third, fourth and ninth to twelfth embodiments of the present invention, the surface area of a curved surface constituting the rough surface (A2) is used. In general, if a curved surface of a rough surface can be represented by a common function z=f(x, y), the surface area of the curved surface constituting the rough surface (A2) can be represented by the following equation (9) wherein D is a region for which the average is calculated.

[#7]

$$A2 = \int\int_D \sqrt{1 + \left(\frac{\partial z}{\partial x}\right)^2 + \left(\frac{\partial z}{\partial y}\right)^2}\, dx dy \qquad (9)$$

However, although it is possible to use such a function for product designing, it is almost impossible to describe a rough surface with a general function for an actual product, and therefore the surface area (A2) can hardly be obtained. Therefore, in the third, fourth and ninth to twelfth embodiments of the present invention, a value calculated as follows is defined as the surface area of a curved surface (A2).

First, surface heights of the rough surface are measured by using a surface profiler at positions defined by dividing an approximately square area 1 mm² or larger at an arbitrary position on the rough surface in a lattice pattern with predetermined intervals ($\Delta d_L$, $\Delta d_H$) for the longitudinal and transverse directions. When the surface heights for the approximately square region on the base plane are measured at points in numbers of r for the longitudinal direction and s for the transverse direction, the data for those of points (numbering r×s), and the respective data points are represented as {($H_{11}$, $H_{12}$, $H_{13}$, ... $H_{1s}$), ($H_{21}$, $H_{22}$, $H_{23}$, ... $H_{2s}$), ... ($H_{r1}$, $H_{r2}$, $H_{r3}$, ... $H_{rs}$)}. The number of measurement points for the longitudinal and transverse directions, r and s, may be the same or different, so long as the region is approximately square. Further, the measurement intervals for the longitudinal and transverse directions, $\Delta d_L$ and $\Delta d_H$, may also be the same or different.

Then, one diagonal line is drawn in each unit lattice having lengths of $\Delta d_L$ and $\Delta d_H$ for the longitudinal and transverse directions, on the base plane, to divide the lattice into two triangles. From height data for the positions of three apexes of each of these two triangles on the base plane, "one triangle plane" (henceforth referred to as "minute triangle plane") is uniquely defined for each triangle on the base plane, and area of this minute triangle plane can be obtained by calculation. If $\Delta d_L$ and $\Delta d_H$ are sufficiently small, the curved surface constituting the rough surface is approximated by the planes of the minute triangles. Therefore, the curved surface area (A2) can be obtained by applying this method to all the unit lattices in the approximately square area for which the heights are measured to thereby approximate the curved surface constituting the rough surface with planes of minute triangles, obtaining areas of the minute triangle planes and summing the areas.

The lengths of the measurement intervals ($\Delta d_L$ and $\Delta d_H$) mentioned above are lengths that serve to correctly reflect the profile of the rough surface included in the measurement region, and both are about 1.0 μm or shorter.

Further, the light control film according to the thirteenth embodiment of the present invention is the light control film according to any one of the first to twelfth embodiments mentioned above, wherein absolute value of average ($\phi_{ave}$) of angles ($\phi$, −180 degrees<$\phi$≦180 degrees), between orthogonal projections of normals of the curved surface of the rough surface projected on the base plane and one side of the approximately square region, is not more than 5 degrees irrespective of the direction along which the approximately square region is defined on the rough surface (the condition providing an absolute value of the average ($\phi_{ave}$) not more than 5 is referred to as "condition 13" hereafter). If the condition 13 for $\phi_{ave}$ is satisfied for the approximately square region defined along an arbitrary direction on the rough surface, glare of the light control film can be further reduced. In order to obtain such a light control film satisfying the condition 13, multiple convex portions constituting the rough surface are preferably substantially independent from one another, and each convex portion preferably consists of a revolution body such as shown in FIGS. 2-2, described later.

A backlight unit according to the fourteenth embodiment of the present invention is a backlight unit comprising a light guide plate equipped with a light source end portion and having a light emergent surface approximately perpendicular to the end portion and a light control film provided on the light emergent surface of the light guide plate, wherein the aforementioned light control film is used as the light control film. A backlight unit according to the fifteenth embodiment of the present invention is the aforementioned backlight unit, but additionally includes a prism sheet between the light control film and the light guide plate.

A backlight unit according to the sixteenth embodiment of the present invention is a backlight unit comprising a light source, a light diffusive plate provided on one side of the light source and a light control film provided on the side of the light diffusive plate opposite to the light source side, wherein the aforementioned light control film is used as the light control film.

The light control film according to any one of the first to thirteenth embodiments of the present invention can increase the components of light in the front direction, in particular, those in the range of emergent angles of 0 to 30 degrees, for light entering from the surface opposite the rough surface and emerging from the rough surface, and thus it can provide markedly higher front luminance, compared with conventional diffusing films. In addition, it also has appropriate light diffusing property and does not create glare or an interference pattern.

Further, the backlight unit according to the fourteenth or fifteenth embodiment of the present invention is a backlight unit providing high front luminance and appropriate light diffusion, without producing glare or an interference pattern, because it includes the light control film of the invention. Moreover, scratches on a prism sheet due to contact with other members are avoided.

BRIEF DESCRIPTION OF THE DRAWINGS

FIGS. 1(a), 1(b) and 1(c) are sectional views of embodiments of the light control film of present invention;

FIGS. 2-1 is a sectional view of a three-dimensional convex shape used in the present invention for simulating differences in emergent angle characteristics as determined by the shape;

FIGS. 2-2 is a perspective view of the three-dimensional convex shape used in the present invention for simulating differences in emergent angle characteristics as determined by the shape

DESCRIPTION OF THE PREFERRED EMBODIMENTS

Figure 2:
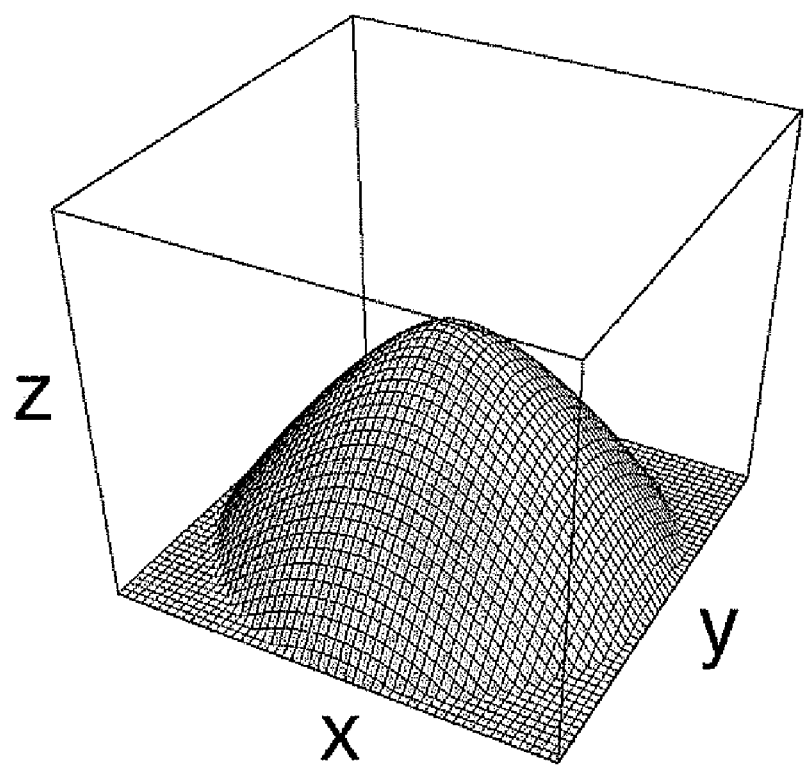

Hereafter, the light control film and backlight unit of the present invention will be explained in detail with reference to the drawings. The sizes (thickness, width, height etc.) of the elements illustrated in the drawings used for explanation of the present invention are enlarged or reduced as required for explanation and do not reflect actual sizes of the elements of actual light control film and backlight unit.

FIGS. 1 (a) to 1(c) schematically show examples of the light control film of the present invention. As shown in the drawings, the light control film of the present invention has fine convexoconcaves formed on one face of a substantially planar film and has a characteristic profile of the convexoconcaves. The convexoconcaves may be formed on a layer provided on one face of a film used as a substrate as shown in 1(a) and 1(b), or the light control film may be formed as single layer on which convexoconcaves are formed as shown in 1(c).

When light enters into the light control film of the present invention from the surface opposite to the surface on which convexoconcaves are formed and emerges from the rough surface, the light control film of the present invention controls direction of components of the light so that those components emerging at an angle to the front direction, within a predetermined range, are increased to enhance front luminance and light diffusion, while preventing glare. Although the surface opposite the surface on which convexoconcaves are formed is typically a smooth surface, it is not limited to a smooth surface. For example, it may have matting or a predetermined dot pattern etc.

Hereafter, the parameters of the profile of the convexoconcaves for controlling direction of light described above will be explained.

In the present invention, conditions for obtaining optimum emergent light were first investigated for a single convex portion (FIGS. 2-2) consisting of a revolution body formed by rotating an arbitrary curve such as shown in FIGS. 2-1 on a xy-plane, as a base plane, around a z-axis perpendicular to the xy-plane by simulating the relationship between incident light and emergent light in a three-dimensional space, with change of the convex shape, height, angle of incident light and so forth. The distribution of light emerging from the convex side (emergent angle characteristics) was obtained by calculation for the case where light, having the same distribution as that of light emerging from a light guide plate in an actual backlight unit, enters from the bottom face side of the convex portion. The calculation was performed by assuming that the refractive index of the inside of the convex portion was 1.5, which is the refractive index of a common acrylic resin.

Figure 3:
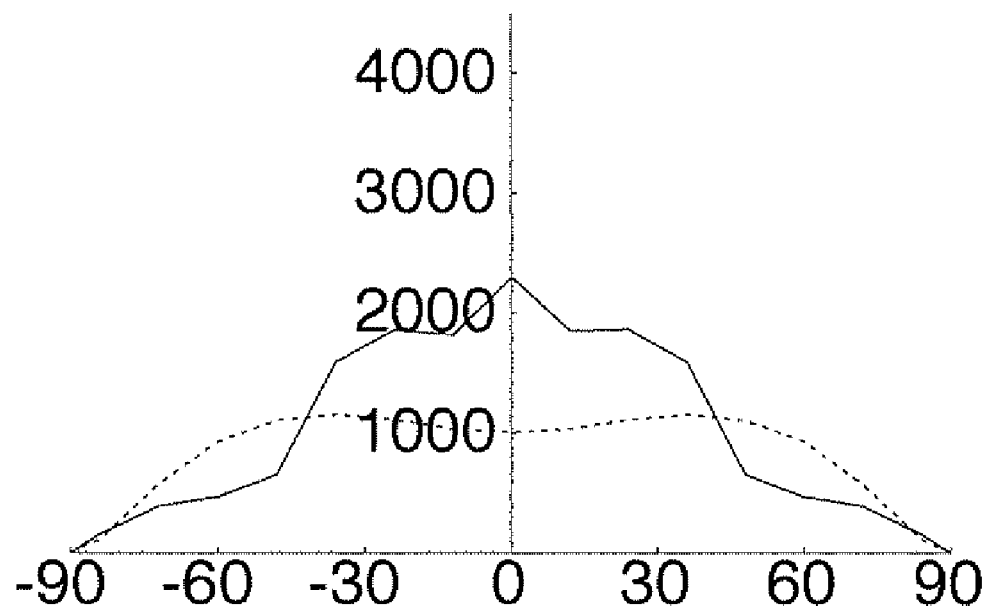
FIG. 3 is a graph of results of three-dimensional simulation performed by changing shape of convex portion in an embodiment of the invention.

FIG. 3 shows a graph representing distribution of emergent light, which is a result of simulation performed for the convex portion having the shape shown in FIGS. 2-2. In the graph, the solid line represents distribution of emergent light, and the dotted line represents distribution of incident light. In order to provide favorable front luminance and light scattering to a certain degree, it is desirable that components of light emerge at an angle within the range of 0 degree±30 degrees to the front direction.

Figure 4:
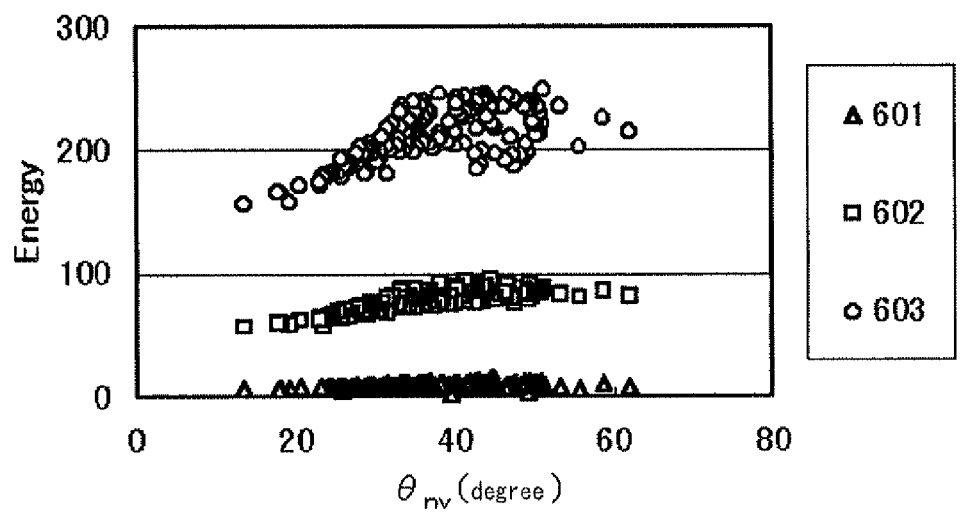
FIG. 4 is a graph of results for $\theta_{nv}$ of three-dimensional simulation performed by changing shape of convex portion in an embodiment of the invention.

Then, in order to find conditions for obtaining emergent light characteristics satisfying such conditions for a rough surface on which multiple convex portions are formed, change of emergent light distribution was simulated while the shape of the convex portions and height thereof was variously changed for a system having a multiple number of the convex portions mentioned above. Specifically, by using, for the convex portion, a constant bottom area, 5 to 6 different heights, and about 100 curve shapes for each height, a total of 500 to 600 different shapes of the convex portion were defined, and distribution of emergent light was simulated for 500 to 600 different samples, each sample having multiple convex portions of a single shape on a plane. The results are shown in the graph of FIG. 4. In the graph, the horizontal axis represents average of slopes of the curved surface ($\theta_{nv}$), and the vertical axis represents energy of emergent light. In the graph, among the points represented by Δ, □ and ○, those of the first group 601 represented by Δ indicate energies of emergent light within the range of 6 degrees about the z axis (henceforth referred to as "emergent light$_6$") for the samples, those of the second group 602 represented by □ indicate energies of emergent light within the range of 18 degrees about the z axis (henceforth referred to as "emergent light$_{18}$") for the samples, and those of the third group 603 represented by ○ indicate energies of emergent light within the range of 30 degrees about the z axis (henceforth referred to as "emergent light$_{30}$") for the samples.

From the simulation results shown in FIG. 4, it was found that if the average of slopes of the curved surface ($\theta_{nv}$) was not less than 27 degrees and not more than 70 degrees, preferably not less than 27 degrees and not more than 65 degrees, more preferably not less than 27 degrees and not more than 60 degrees, the ratio of the emergent light$_{30}$ increased.

Moreover, in the simulation results shown in FIG. 4, there was observed a tendency that the ratio of the emergent light$_{30}$ increased as the average of slopes of the curved surface ($\theta_{nv}$) became larger, but when it exceeded a certain level, the ratio conversely decreased. Therefore, a comprehensive index of convexoconcave profiles providing correlation with the emergent light$_{30}$ was investigated. As a result, it was found that if a quotient or product of the average of slopes of the curved surface ($\theta_{nv}$) and a ratio of a surface area of the curved surface constituting the rough surface (A2) to an area of an approximately square region on the rough surface (A1, area of the orthogonal projection of the rough surface) ($A_r$=A2/A1, henceforth referred to as "surface area ratio") was used, the relation with the emergent light$_{30}$ can be best described. A2 can be obtained by totaling the areas of planes in a minute triangle shape obtained from height data.

Figure 5:
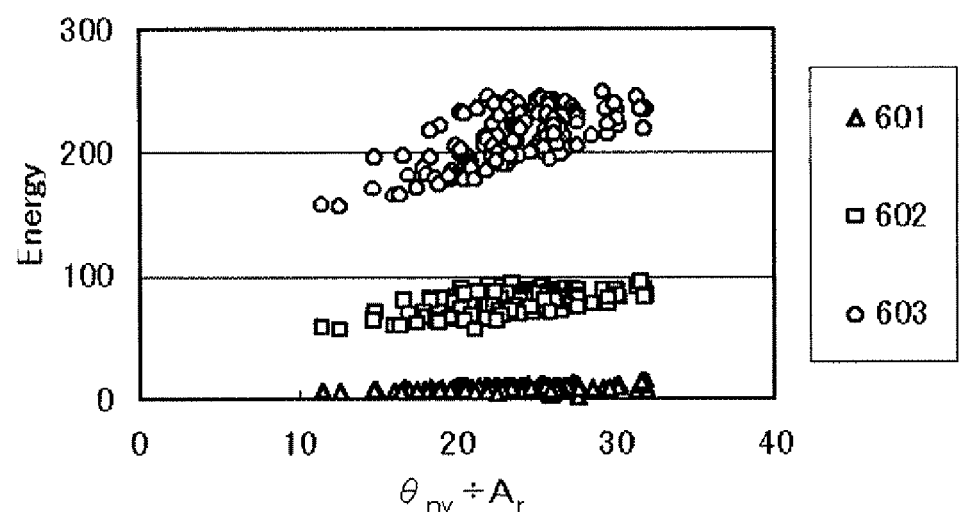
FIG. 5 is a graph of results for $\theta_{nv} \div A_r$ in three-dimensional simulation performed by changing shape of convex portion in an embodiment of the invention.
Figure 6:
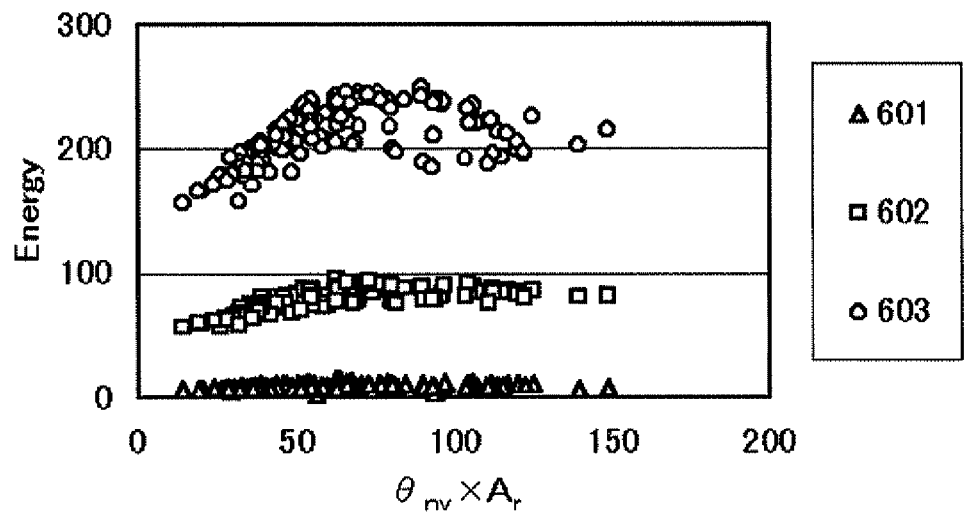
FIG. 6 is a graph of results for $\theta_{nv} \times A_r$ three-dimensional simulation performed by changing shape of convex portion in an embodiment of the invention.

FIGS. 5 and 6 show graphs representing the simulation data of FIG. 4 by using the indexes of $\theta_{nv}$ and $A_r$. FIG. 5 represents change of the emergent light energy with change of a value obtained by dividing the average of slopes of the curved surface ($\theta_{nv}$) by the surface area ratio ($A_r$) plotted on the horizontal axis, and FIG. 6 represents change of the emergent light energy with change of a value obtained by multiplying the average of slopes of the curved surface ($\theta_{nv}$) by the surface area ratio ($A_r$) plotted on the horizontal axis.

From the results shown in FIGS. 5 and 6, it was found that when the value obtained by dividing the average of slopes of the curved surface ($\theta_{nv}$) by the surface area ratio ($A_r$) (quotient) was not less than 22, or when the value obtained by multiplying the average of slopes of the curved surface ($\theta_{nv}$) by the surface area ratio ($A_r$) (product) was not less than 30 and not more than 140, the energy of emergent light having an emergent angle of 30 degrees or less sharply increased. That is, it can be seen that when either one of the following conditions (equation (1) or equation (2)) is satisfied, a light control film exhibits high frontal luminance and moderate light diffusion.

$$\theta_{nv} \div A_r \geq 22 \tag{1}$$

$$30 \leq \theta_{nv} \times A_r \leq 140 \tag{2}$$

The value obtained by dividing the average of slopes of the curved surface ($\theta_{nv}$) by the surface area ratio ($A_r$) in the formula (1) is more preferably not less than 25. As for the lower limit of the product of the average of slopes of the curved surface ($\theta_{nv}$) and the surface area ratio ($A_r$) in the formula (2), it is more preferably not less than 35, and as for the upper limit, the product is more preferably not more than 130.

Such conditions must be satisfied at substantially any position. The expression "substantially any position" is used to mean that it is sufficient that the conditions should be satisfied at almost all observation positions when observation is performed at multiple measurement positions for a certain specific light control film, and it includes a case wherein the conditions are not satisfied at one or two positions.

In the aforementioned simulation for finding conditions which the rough surface of the present invention must satisfy, the convex portions were assumed to consist of a material having a refractive index of 1.5. However, materials generally used for optical films can be used for the patterned layer of the light control film of the present invention, and the refractive index thereof is not limited to 1.5. In order to generalize the conditions in consideration of the refractive index n, the aforementioned simulation was repeated, changing the refractive index within a predetermined range. As a result, it was found that when the average of slopes of the curved surface ($\theta_{nv}$) is not less than (59−20n) degrees and not more than 70 degrees, the aforementioned effect could be obtained.

If the aforementioned formulas (1) and (2) are similarly generalized in consideration of the refractive index n, they can be represented as the following formulas (3) and (4).

$$\theta_{nv} \div A_r \times n^2 \geq 35 \tag{3}$$

$$60 \leq \theta_{nv} \times A_r \times n^2 \leq 350 \tag{4}$$

The value of the left side of the formula (3) is more preferably not less than 40. As for the lower limit of the value of the center portion of the formula (4), it is preferably not less than 70, and as for the upper limit, the value is more preferably not more than 340. By designing the convexo-concave profile in consideration of the refractive index of the material constituting the convexoconcaves as described above, the luminance in the frontal direction can be further improved.

Another comprehensive index of the convexo-concave profile that could provide correlation with the emergent light$_{30}$ was further investigated on the basis of the results of the aforementioned simulation, and as a result, it was found that if a numerical value $A_{sk}$ representing an index of asymmetry of a probability density function for the height direction obtained from all the surface height data used for obtaining the average of slopes of the curved surface, or a numerical value $A_{ku}$ representing an index of sharpness of the probability density function for the height obtained from all the surface height data is used, the correlation with the emergent light$_{30}$ could be better described.

Figure 7:
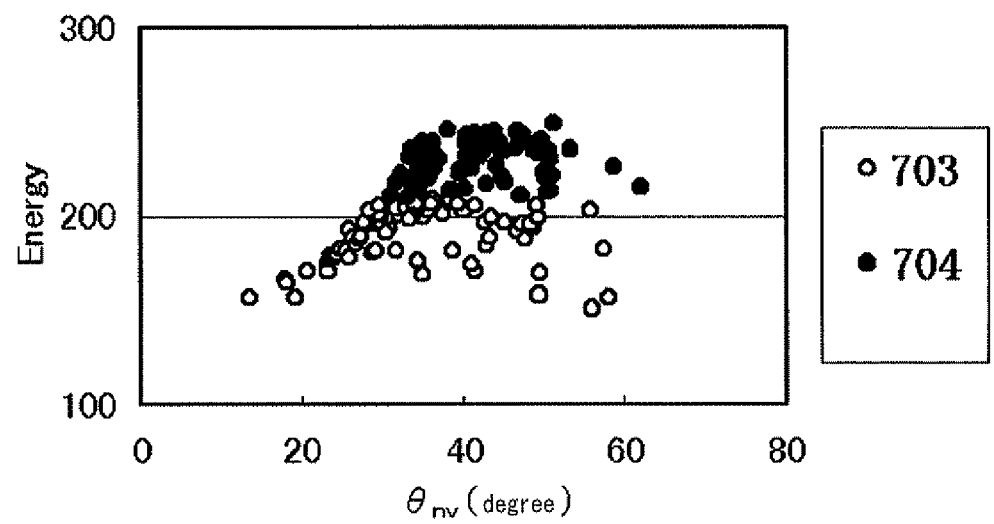
FIG. 7 is a graph of values for $\theta_{nv}$ obtained in results of three-dimensional simulation performed by changing shape of convex portion in an embodiment of the invention.
Figure 8:
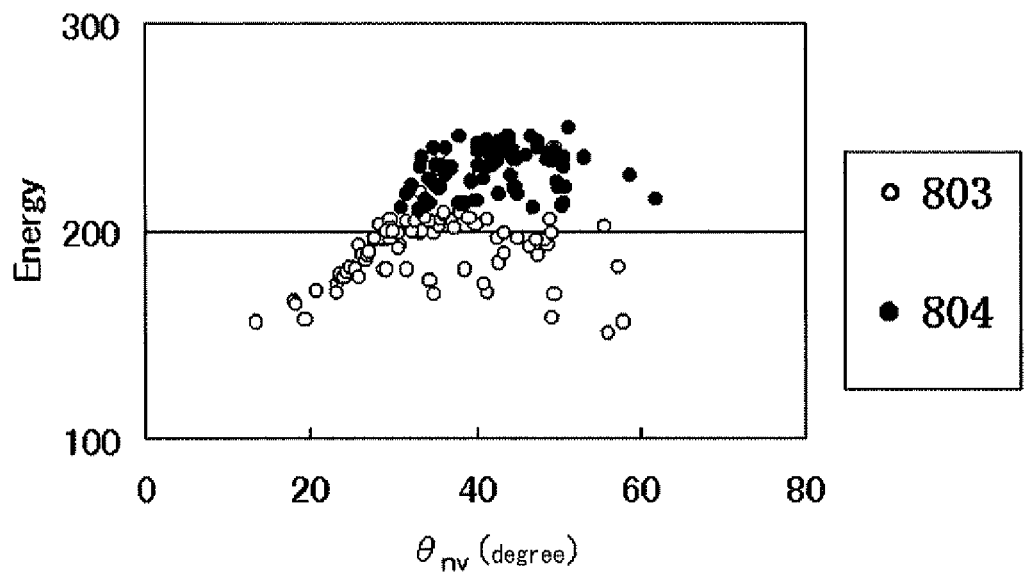
FIG. 8 is another graph of $\theta_{nv}$ obtained in three-dimensional simulation performed by changing shape of convex portion in an embodiment of the invention.

FIGS. 7 and 8 show graphs representing the simulation data of FIG. 4 by using the index of $\theta_{nv}$ and both represent change of the emergent light energy with change in the average of slopes of the curved surface ($\theta_{nv}$) plotted on the horizontal axis. In FIG. 7, the points "●" 704 represent the data for the samples showing a value of 1.2 or less as an absolute value of $A_{sk}$ represented by the aforementioned formula (5). In FIG. 8, the points for "●" 804 represent the data of the samples showing a value of not less than 1.5 and not more than 5.0 as $A_{ku}$ represented by the aforementioned formula (6).

From the results shown in FIGS. 7 and 8, it was found that the energy of emergent light having a projected angle of 30 degrees or less tended to sharply increase when the average of slopes of the curved surface ($\theta_{nv}$) was not less than 27 degrees and not more than 70 degrees, whereas the percentage of the emergent light$_{30}$ did not become high in some cases even if the average of slopes of the curved surface ($\theta_{nv}$) was within the aforementioned range (the points "○" 703 in FIG. 7, and the points "○" 803 in FIG. 8). However, it was found that if only the results where the absolute value of $A_{sk}$ represented by the aforementioned formula (5) was not more than 1.2 (points "●" 704 in FIG. 7) were taken, the percentage of the emergent light$_{30}$ was always high. Moreover, it was found that if only the results where $A_{ku}$, represented by the aforementioned formula (6), was not less than 1.5 and not more than 5.0 (points "●" 804 in FIG. 6) were observed, the percentage of the emergent light$_{30}$ was always high.

When the average of slopes of the curved surface ($\theta_{nv}$) is not less than 27 degrees and not more than 70 degrees, preferably not less than 27 degrees and not more than 65 degrees, more preferably not less than 27 degrees and not more than 60 degrees, and the absolute value of $A_{sk}$ represented by the formula (5) is not more than 1.2, preferably not more than 1.1, or $A_{ku}$ represented by the formula (6) is not less than 1.5 and not more than 5.0, preferably not less than 1.5 and not more than 4.5, a particularly superior effect can be obtained.

Such conditions must be satisfied at substantially any position. The expression "substantially any position" is used to mean that it is sufficient that the conditions should be satisfied at almost all observation positions when observation is performed at multiple measurement positions for a certain specific light control film, and it includes a case wherein the conditions are not satisfied at one or two positions.

In the aforementioned simulation for finding the conditions which the rough surface of the present invention must satisfy, the convex portions were assumed to consist of a material having a refractive index of 1.5. However, materials generally used for optical films can be used for the patterned layer of the light control film of the present invention, and the refractive index thereof is not limited to 1.5. If the condition is generalized in consideration of the refractive index n, when the average of slopes of the curved surface ($\theta_{nv}$) is not less than (59−20n) degrees and not more than 70 degrees, the aforementioned effect can be obtained.

By designing the convexo-concave profile in consideration of the refractive index of the material constituting the patterned layer as described above, the luminance in the frontal direction can be further improved.

Figure 9:
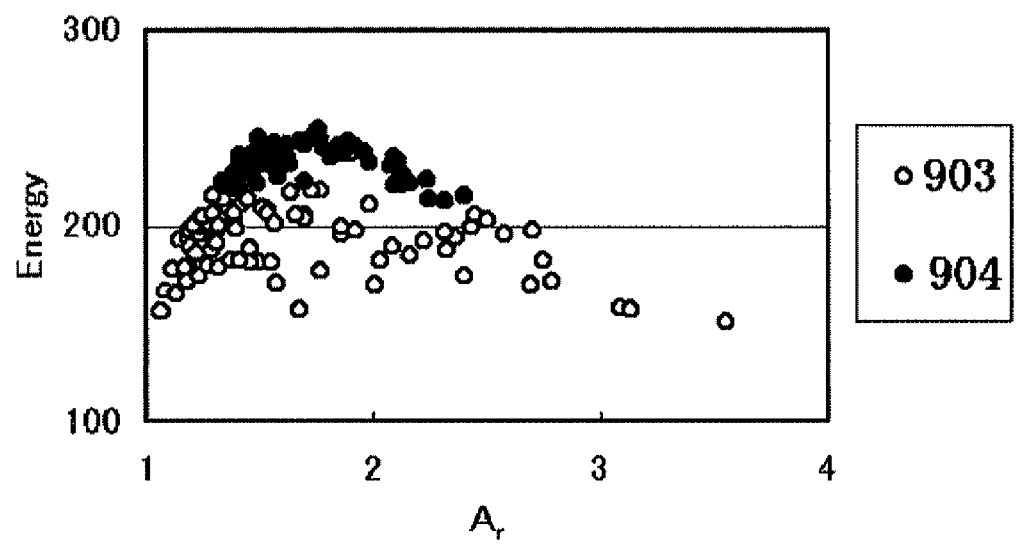
FIG. 9 is a graph of values for Ar obtained in three-dimensional simulation performed by changing shape of convex portion in an embodiment of the invention.
Figure 10:
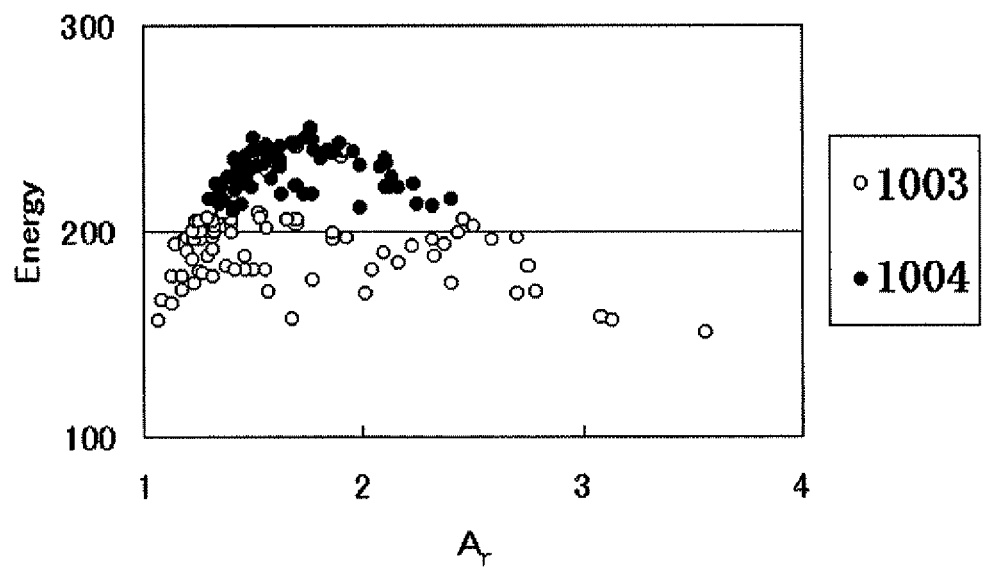
FIG. 10 is another graph of values for $A_r$ obtained in three-dimensional simulation performed by changing shape of convex portion in an embodiment of the invention.

FIGS. 9 and 10 show graphs representing the simulation data of FIG. 4 by using the surface area ratio ($A_r$), and both the graphs represent change of the emergent light energy with change of the surface area ratio ($A_r$) plotted on the horizontal axis. In FIG. 9, the points "●" 904 represent the data of the samples showing a value not more than 1.2 as an absolute value of $A_{sk}$ represented by the aforementioned formula (5). In FIG. 10, the points "●" 1004 represent the data of the samples showing a value not less than 1.5 and not more than 5.0 as $A_{ku}$ represented by the aforementioned formula (6).

From the results shown in FIGS. 9 and 10, it was found that the energy of light emergent at an angle of 30 degrees or less tended to sharply increase when the surface area ratio ($A_r$) is not less than 1.2 and not more than 2.5, whereas the percentage of the emergent light$_{30}$ did not become high in some cases even if the surface area ratio ($A_r$) was within the aforementioned range (the points "○" 903 in FIG. 9, and the points "○" 1003 in FIG. 10). However, it was found that if only the results where the absolute value of $A_{sk}$ represented by the aforementioned formula (5) was not more than 1.2 (points "●" 904 in FIG. 9) were observed, the percentage of the emergent light$_{30}$ was always high. Moreover, it was found that if only the results where $A_{ku}$ represented by the aforementioned formula (6) was not less than 1.5 and not more than 5.0 (points "●" 1004 in FIG. 10), the percentage of the emergent light$_{30}$ was always high.

When this surface area ratio ($A_r$) is not less than 1.2 and not more than 2.5, preferably not less than 1.3 and not more than 2.4, more preferably not less than 1.4 and not more than 2.3, and the absolute value of $A_{sk}$ represented by the formula (5) is not more than 1.2, preferably not more than 1.1, or $A_{ku}$ represented by the formula (6) is not less than 1.5 and not more than 5.0, preferably not less than 1.5 and not more than 4.5, a particularly superior effect can be obtained.

Such conditions must be satisfied at substantially any position. The expression "substantially any position" is used to mean that it is sufficient that the conditions should be satisfied at almost all observation positions when observation is performed at multiple measurement positions for a certain specific light control film, and it includes a case wherein the conditions are not satisfied at one or two positions.

In the aforementioned simulation for finding the conditions which the rough surface of the present invention must satisfy, the convex portions were assumed to consist of a material having a refractive index of 1.5. However, materials generally used for optical films can be used for the patterned layer of the light control film of the present invention, and the refractive index thereof is not limited to 1.5. If the conditions are generalized in consideration of the refractive index n, the aforementioned effect can be obtained when the surface area ratio ($A_r$) is not less than (2−0.5n) and not more than 2.5.

By designing the profile of the rough surface in consideration of the refractive index of the material constituting the patterned layer as described above, the luminance in the frontal direction can be further improved.

By designing the rough surface so that it satisfies the aforementioned conditions, the light control film of the present invention can exhibit high front luminance, and light diffusion of a certain degree. The light control film of the present invention having such characteristics is disposed, for example, directly on a light guide plate of a backlight unit of the edge light type, or via a light diffusing material on a light source of a backlight unit of the direct type, and used as a film for controlling the direction of emergent light of the backlight unit.

Figure 11:
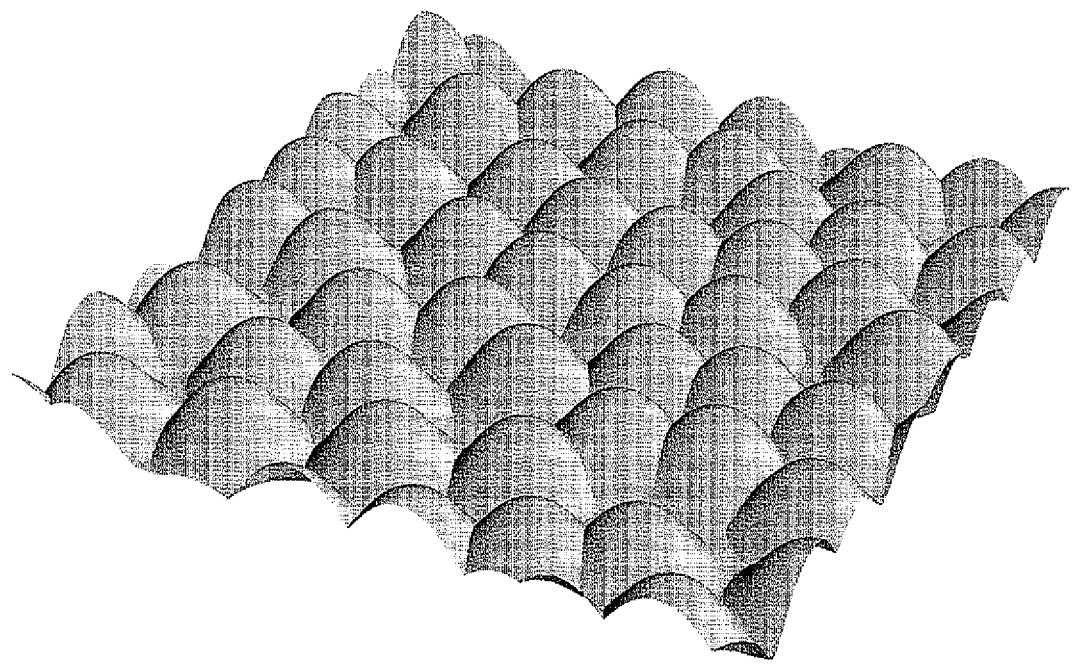
FIG. 11 is a perspective view of an example of the rough surface of the light control film of present invention.

So long as "the average of slopes of the curved surface ($\theta_{nv}$) of the rough surface" or "the surface area ratio ($A_r$)" of the light control film of the present invention satisfies any one of the aforementioned conditions 1 to 12, the shape and arrangement of the convex portions are not particularly limited. That is, the convex portions and concave portions may be randomly or regularly arranged. However, if a random arrangement is used, generation of an interference pattern can be easily prevented even if another member having, a regular pattern is used in combination. Individual convex portions and concave portions may have the same shape or different shapes, and they may be arranged so that they overlap one another, or a part or all of the convex portions and concave portions overlap one another. The height of the convex portions and depth of the concave portions are both about 3 to 100 µm, and density of the convex portions or the concave portions is preferably about 10 to 200,000 portions/mm². A typical rough surface of the light control film satisfying the aforementioned conditions is shown in FIG. 11.

Hereafter, specific configurations for producing the light control film having the aforementioned rough surface will be explained.

As the material constituting the substrate 11 and the patterned layer 12 of the light control film 10 of the present invention, materials generally used for optical films can be used. Specifically, the material for the substrate 11 is not especially limited so long as it is a material exhibiting favorable light transmission, and plastic films such as those of polyethylene terephthalate, polybutylene terephthalate, polyethylene naphthalate, polycarbonate, polyethylene, polypropylene, polystyrene, triacetyl cellulose, polyacrylate, polyvinyl chloride, and so forth can be used.

The material constituting the patterned layer 12 also is not especially limited so long as a material exhibiting favorable light transmission is chosen, and glass, polymer resins, and so forth can be used. Examples of the glass include oxide glass such as silicate glass, phosphate glass, and borate glass. Examples of the polymer resins include thermoplastic resins, thermosetting resins, and ionizing radiation curable resins such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins, and so forth.

Among these materials, polymer resins are preferred in view of workability and handling, and those having a refractive index (JIS K7142:1996) of about 1.3 to 1.7 are especially preferred. Even if a material having a refractive index n outside of the aforementioned range is used as the material constituting the patterned layer, favorable luminance can be realized so long as the condition 1, 3, 5, 7, 9 or 11 is satisfied. However, by using a material having a refractive index within such a range, high luminance can be obtained. In particular, by designing the rough surface so that it satisfies one of the conditions 2, 4, 6, 8, 10 or 12, depending on the refractive index of the material, frontal luminance can be further improved.

Although the patterned layer 12 may comprise light diffusing agents such as beads of organic materials and inorganic pigments, as with general light diffusive sheets they are not indispensable. The light control film of the present invention provides light diffusion to a certain degree by the rough surface itself, even if it does not comprise light diffusing agents. If light diffusing agents are not used, the other members can not be damaged by light diffusing agents, and light diffusing agents will not separate and generate dust.

As the method for forming the patterned layer 12, 1) a method using an embossing roller, 2) a method using an etching treatment, and 3) a method using molding can be employed. However, production using a mold is preferred, because it enables production of light control films having a predetermined patterned layer with good reproducibility. Specifically, a mold having a profile complementary to that of the rough surface is prepared, a material constituting the patterned layer such as polymer resins is introduced into the mold, the material is cured and then removed from the mold. When a substrate is used, the light control film can be produced by casting a polymer resin or the like into the mold, superimposing a transparent substrate thereon, curing the polymer resin or the like, and removing the cured material together with the transparent substrate from the mold.

Although the method of forming a profile complementary to the rough surface in the mold is not particularly limited, the following method can be employed. For example, convex portions having a specific shape are formed on a plate, with a density of several thousands portions/mm², by a laser microprocessing technique, and this plate is used as a male mold to prepare a female mold. Convex portions having a specific shape means that when height data thereof are measured at equal intervals of a length that allows correct reflection of the shape of one whole convex portion (1.0 µm or shorter), the convex portions should satisfy condition 1 or 3. Alternatively, resin plates having a convex-concave layer are prepared by curing a resin containing particles of a predetermined size dispersed therein, the surfaces of the patterned layers are measured by using a surface profiler to choose a resin plate satisfying the aforementioned conditions, and a female mold is prepared by using the chosen plate as a male mold.

Although the surface of the light control film opposite the rough surface may be smooth, it may be subjected to a fine matting treatment to prevent generation of Newton rings when the film is brought into contact with a light guide plate or resin plate, or an antireflection treatment in order to improve light transmittance.

Moreover, in order to obtain favorable front luminance, as an optical characteristic of the light control film, the film desirably has a haze of 60% or more, preferably 70% or more. The haze referred to herein is a value for haze defined in JIS K7136:2000, and is a value obtained in accordance with the equation: Haze (%)=$[(\tau_4/\tau_2)-\tau_3(\tau_2/\tau_1)] \times 100$ ($\tau_1$: flux of incident light, $\tau_2$: total light flux transmitted through a test piece, $\tau_3$: light flux diffused in a unit, $\tau_4$: light flux diffused in the unit and test piece).

Although the total thickness of the light control film is not particularly limited, it is usually about 20 to 300 µm.

The light control film of the present invention explained above is mainly used as a member of a backlight constituting a liquid crystal display, illumination signboard, and so forth.

Hereafter, the backlight of the present invention will be explained. The backlight of the present invention consists at least of a light control film and a light source. As the light control film, the aforementioned light control film of the invention is used. Although the orientation of the light control film arranged in the backlight is not particularly limited, it is preferably arranged so that the rough surface serves as a light emergent surface. For the backlight, a configuration called the edge light type or the direct type is preferably employed.

A backlight of the edge light type consists of a light guide plate, a light source disposed on at least one end of the light guide plate, a light control film disposed on the light emergent surface side of the light guide plate, and so forth. The light control film is preferably arranged so that the rough surface serves as the light emergent surface. Further, a prism sheet is preferably used between the light guide plate and the light control film. With such a configuration, a backlight unit exhibiting superior balance of front luminance and viewing angle, without glare, which is a problem peculiar to a prism sheet, can be provided.

The light guide plate has a substantially plate-like shape with at least one of its sides serving as a light incident surface and one of its surfaces perpendicular to the light incident side serving as a light emergent surface. The light guide plate is formed mainly of a matrix resin selected from highly transparent resins such as polymethyl methacrylate. Resin particles having a refractive index different from that of the matrix resin may be added as required. Each surface of the light guide plate need not be a uniform plane, but may have a complicated surface profile, or may be subjected to diffusion printing of a dot pattern or the like.

The light source is disposed at an end of the light guide plate, and a cold-cathode tube is mainly used for this purpose. Examples of the shape of the light source include a linear shape, L-shape, and so forth.

Besides the aforementioned light control film, light guide plate, and light source, the backlight of the edge light type may be equipped with a light reflector, a polarization film, an electromagnetic interference shield film etc., depending on the purpose.

Figure 12:
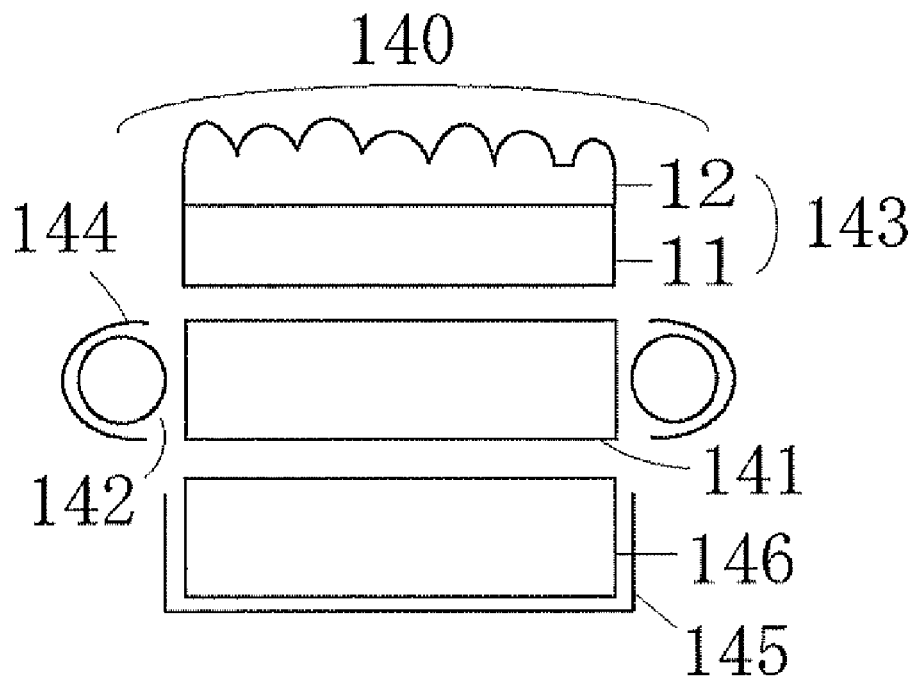
FIG. 12 is a cross-sectional view of an embodiment of the backlight unit of the present invention

One embodiment of the backlight of the edge light type according to the present invention is shown in FIG. 12. This backlight 140 has a configuration wherein light sources 142 are provided on the both sides of a light guide plate 141, and a light control film 143 is placed on the upper side of the light guide plate 141 so that a rough surface is exposed to the outside. The light sources 142 are covered with light source rear reflectors 144 except for the portions facing the light guide plate 141 so that light from the light source efficiently enters into the light guide plate 141. Moreover, a light reflector 146 housed in a chassis 145 is provided under the light guide plate 141. By this configuration, light projected on the side of the light guide plate 141 opposite the projecting side is returned into the light guide plate 141, to increase the light emerging from the projection surface of the light guide plate 141.

A backlight of the direct type consists of a light control film, a light diffusive material and a light source, disposed in this order on a surface of the light control film, opposite the light emergent surface, and so forth. The light control film is preferably oriented so that the rough surface serves as the light emergent surface. Moreover, a prism sheet is preferably used between the light diffusing material and the light control film. With such a configuration, the backlight unit exhibits superior balance of front luminance and viewing angle, without glare, which is a problem peculiar to a prism sheet.

The light diffusive material erases the pattern of the light source, and a milky resin plate, a transparent substrate on which a dot pattern is formed on a portion corresponding to the light source (lighting curtain), as well as a so-called light diffusive film having a convexo-concave light diffusing layer on a transparent film, and so forth can be used individually or in a suitable combination.

As the light source, a cold-cathode tube is mainly used. Examples of the shape of the light source include a linear shape, L-shape, and so forth. Besides the aforementioned light control film, light diffusing material, and light source, the backlight of the direct type may be equipped with a light reflector, a polarization film, an electromagnetic wave shield film, etc., depending on the purpose.

Figure 13:
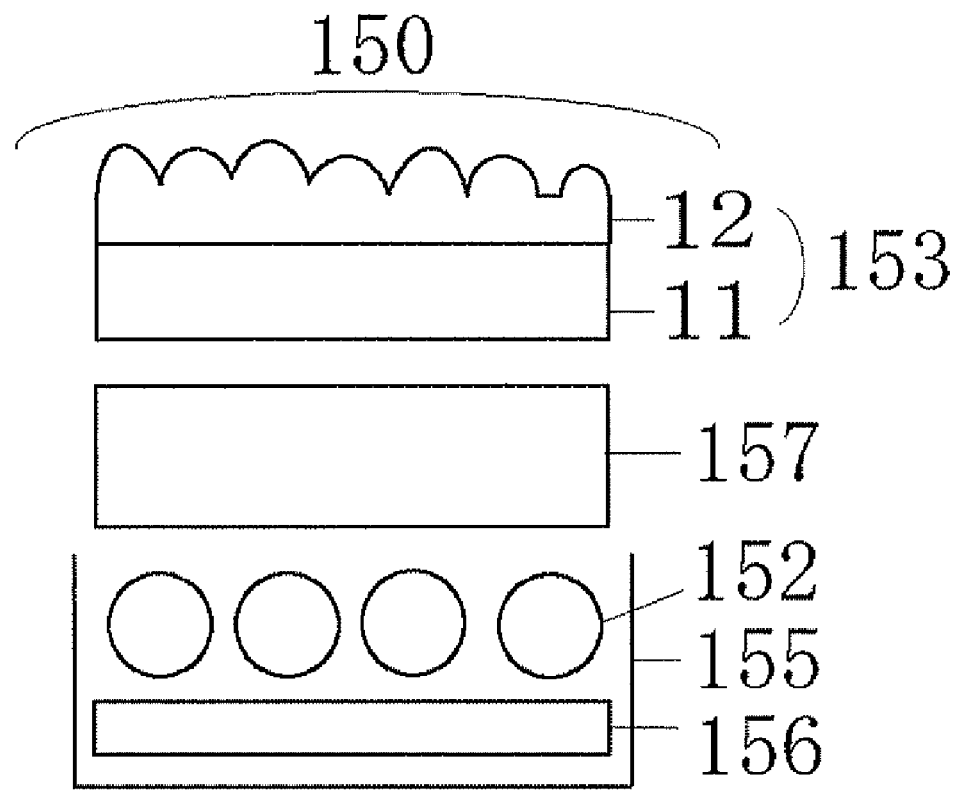
FIG. 13 is a cross-sectional schematic view of another embodiment of the backlight unit of the present invention.

One embodiment of the backlight of the direct type according to the present invention is shown in FIG. 13. This backlight 150 has a configuration wherein plural light sources 152 are provided above a light reflector 156 housed in a chassis 155, and a light control film 153 is placed thereon via a light diffusive material 157, as shown in the drawing.

Because the backlight of the present invention utilizes a light control film having a specific rough surface as a light control film that controls direction of light emerging from a light source or a light guide plate, it improves front luminance as compared with conventional backlights, and suffers from the problems of glare and scratches to lesser degrees, as compared with the case of using a prism sheet alone.

EXAMPLES

Hereafter, the present invention will be further explained with reference to examples.

Examples 1 to 4

Four kinds of molds (1) to (4) on which predetermined convexo-concave profiles were formed by a laser microprocessing technique were prepared, an ultraviolet curing resin having a refractive index of 1.50 was poured into the molds (1) to (3), and a silicone resin having a refractive index of 1.40 was poured into the mold (4). Subsequently, the poured resins were cured, and then taken out from the molds to obtain light control films (1) to (4) having a size of 23 cm (for the direction perpendicular to the light source)×31 cm (for the direction parallel to the light source) (light control films of Examples 1 to 4).

Then, heights of the rough surface (light emergent surfaces) of the light control films (1) to (4) were measured by using a laser microscope (VK-9500, KEYENCE CORP.) with an objective lens of magnification ×50. The measurement interval in the plane was about 0.26 μm. Since one field of the objective lens of magnification ×50 is 270 μm×202 μm, an automatic connecting function was used to obtain surface height data of a region of 1 mm×1 mm. The measurement was performed at 5 arbitrary positions on each light control film, and averages of slopes of the curved surfaces to base planes ($\theta_{nv}$, unit is degree) were calculated by using the surface height data. The results obtained for the light control films (1) to (4) are shown in Table 1. Further, by using a turbidimeter (NDH2000, Nippon Denshoku), haze of the light control films (1) to (4) was measured according to JIS K7136:2000. The measurement results are also shown in Table 1.

TABLE 1

|  | $\theta_{nv}$ (degree) | haze (%) |
|---|---|---|
| Example 1 | 43.0 | 82.7 |
|  | 43.0 |  |
|  | 43.7 |  |
|  | 41.4 |  |
|  | 41.9 |  |
| Example 2 | 34.1 | 82.6 |
|  | 35.6 |  |
|  | 33.8 |  |
|  | 34.8 |  |
|  | 32.7 |  |

TABLE 1-continued

|  | $\theta_{nv}$ (degree) | haze (%) |
|---|---|---|
| Example 3 | 29.6 | 79.1 |
|  | 28.2 |  |
|  | 28.4 |  |
|  | 28.3 |  |
|  | 31.0 |  |
| Example 4 | 33.4 | 79.7 |
|  | 34.4 |  |
|  | 32.8 |  |
|  | 34.9 |  |
|  | 33.7 |  |

As seen from the results shown in Table 1, the averages of slopes of the curved surfaces of the light control films of Examples 1 to 4 were not less than 27 degrees and not more than 70 degrees at all the measurement points. Moreover, all the light control films of Examples 1 to 4 had a haze of 70% or higher, and thus satisfied the optical characteristics required for obtaining favorable front luminance.

Then, the light control films (1) to (4) were each incorporated into a 15-inch edge light type backlight unit (one cold-cathode tube was provided on each side. That is, the light control films (1) to (4) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (1) to (4) are shown in Table 2 (unit is "cd/m$^2$").

TABLE 2

|  |  | luminance (cd/m$^2$) | | | |
|---|---|---|---|---|---|
|  |  | Example 1 | Example 2 | Example 3 | Example 4 |
| parallel direction | left 45 degree | 1050 | 1130 | 1150 | 1140 |
|  | left 30 degree | 2100 | 1730 | 1630 | 1680 |
|  | 0 degree | 2300 | 1810 | 1680 | 1740 |
|  | right 30 degree | 2070 | 1710 | 1620 | 1660 |
|  | right 45 degree | 1060 | 1130 | 1150 | 1140 |
| perpendicular direction | up 45 degree | 1040 | 1240 | 1290 | 1270 |
|  | up 30 degree | 2370 | 1950 | 1840 | 1890 |
|  | 0 degree | 2300 | 1810 | 1680 | 1740 |
|  | down 30 degree | 2350 | 1940 | 1830 | 1880 |
|  | down 45 degree | 1010 | 1230 | 1290 | 1260 |

It was demonstrated by the results shown in Table 2 that, for the light control films of Examples 1 to 4, only by incorporating one sheet of light control film into the backlight unit, the luminance for emergent angles of 30 degrees or less could be increased, and thus strong light emerged in the front direction.

Examples 5 to 8

Four kinds of molds (5) to (8) on which predetermined convexo-concave profiles were formed by a laser microprocessing technique were prepared, an ultraviolet curing resin having a refractive index of 1.50 was poured into the molds (5) to (7), and a silicone resin having a refractive index of 1.40 was poured into the mold (8). Subsequently, the poured resins were cured, and then taken out from the molds to obtain light control films (5) to (8) having a size of 23 cm×31 cm (light control films of Examples 5 to 8).

Then, heights of the rough surface (light emergent surfaces) of the light control films (5) to (8) were measured in the same manner as that used in Examples 1 to 4. The measurement was performed at 5 arbitrary positions on each light control film, and averages of slopes to base planes of the curved surfaces ($\theta_{nv}$, unit is degree) were calculated by using the obtained surface height data. Further, surface areas of the rough surfaces (A2) were obtained from the same surface height data, the ratios thereof to the orthogonal projections of the measured rough surfaces (A1) ($A_r$=A2/A1) were calculated, and products or quotients were obtained by using the averages of slopes of the curved surface ($\theta_{nv}$), and the surface area ratios ($A_r$). The results obtained for the light control films (5) to (8) are shown in Table 3 (unit of slope is "degree"). Further, by using a turbidimeter (NDH2000, Nippon Denshoku), the haze of each light control films (5) to (8) was measured according to JIS K7136:2000. The measurement results are also shown in Table 3.

TABLE 3

|  | $\theta_{nv}$ (degree) | $A_r$ | $\theta_{nv} \div A_r$ | $\theta_{nv} \times A_r$ | haze (%) |
|---|---|---|---|---|---|
| Example 5 | 42.6 | 1.552 | 27.4 | 66.1 | 82.7 |
|  | 42.2 | 1.573 | 26.9 | 66.4 |  |
|  | 41.1 | 1.613 | 25.5 | 66.3 |  |
|  | 43.1 | 1.500 | 28.8 | 64.7 |  |
|  | 43.6 | 1.594 | 27.3 | 69.4 |  |
| Example 6 | 50.9 | 2.080 | 24.5 | 105.9 | 82.6 |
|  | 52.4 | 2.046 | 25.6 | 107.2 |  |
|  | 51.7 | 2.168 | 23.9 | 112.2 |  |
|  | 53.1 | 2.032 | 26.2 | 108.0 |  |
|  | 48.9 | 2.022 | 24.2 | 98.9 |  |
| Example 7 | 36.5 | 1.389 | 26.3 | 50.7 | 82.0 |
|  | 36.7 | 1.393 | 26.4 | 51.2 |  |
|  | 35.0 | 1.399 | 25.0 | 48.9 |  |
|  | 35.7 | 1.427 | 25.0 | 50.9 |  |
|  | 36.9 | 1.414 | 26.1 | 52.2 |  |
| Example 8 | 44.0 | 1.735 | 25.4 | 76.3 | 82.1 |
|  | 44.8 | 1.809 | 24.7 | 81.0 |  |
|  | 44.6 | 1.713 | 26.1 | 76.5 |  |
|  | 42.0 | 1.732 | 24.2 | 72.7 |  |
|  | 43.8 | 1.749 | 25.1 | 76.7 |  |

As shown in Table 3, in the light control films of Examples 5 to 8, variation in the average of slopes of the curved surface and the surface area ratio was small at all the measurement points, and thus the films had a uniform roughness. Moreover, all the light control films of Examples 5 to 8 had a haze of 70% or higher, and thus satisfied the optical characteristics required for obtaining favorable front luminance.

Then, the light control films (5) to (8) were each incorporated into a 15-inch edge light type backlight unit (one cold-cathode tube was provided on each side). That is, the light control films (5) to (8) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (5) to (8) are shown in Table 4 (unit is "cd/m$^2$").

TABLE 4

| | | luminance (cd/m²) | | | |
|---|---|---|---|---|---|
| | | Example 5 | Example 6 | Example 7 | Example 8 |
| parallel direction | left 45 degree | 1060 | 1100 | 1130 | 1110 |
| | left 30 degree | 2040 | 1850 | 1710 | 1800 |
| | 0 degree | 2220 | 1970 | 1780 | 1900 |
| | right 30 degree | 2020 | 1830 | 1690 | 1780 |
| | right 45 degree | 1080 | 1110 | 1140 | 1120 |
| perpendicular direction | up 45 degree | 1070 | 1170 | 1250 | 1200 |
| | up 30 degree | 2310 | 2090 | 1930 | 2030 |
| | 0 degree | 2220 | 1970 | 1780 | 1900 |
| | down 30 degree | 2280 | 2070 | 1910 | 2010 |
| | down 45 degree | 1040 | 1160 | 1240 | 1190 |

It was demonstrated by the results shown in Table 4 that, for the light control films of examples 5 to 8, only by incorporating one sheet of light control film into the backlight unit, the luminance for emergent angles of 30 degrees or less could be increased, and thus strong light emerged in the front direction.

Comparative Examples 1 to 3

For commercially available light diffusive sheets (Comparative Examples 1 to 3), surface profiles of rough surfaces (light emergent surfaces) were measured at 5 points on each film in the same manner as that used in the foregoing examples, and averages of slopes of the curved surface ($\theta_{nv}$) were calculated. The results obtained for the light diffusive sheets of Comparative Examples 1 to 3 are shown in Table 5 in order.

TABLE 5

| | $\theta_{nv}$ (degree) | haze (%) |
|---|---|---|
| Comparative Example 1 | 25.2 | 89.2 |
| | 25.3 | |
| | 25.0 | |
| | 26.2 | |
| | 26.0 | |
| Comparative Example 2 | 16.8 | 85.7 |
| | 16.3 | |
| | 17.2 | |
| | 16.7 | |
| | 16.1 | |
| Comparative Example 3 | 10.7 | 65.5 |
| | 10.3 | |
| | 10.6 | |
| | 10.7 | |
| | 11.2 | |

As seen from the results shown in Table 5, none of the light diffusive sheets of Comparative Examples 1 to 3 could provide an average of slopes of the curved surface ($\theta_{nv}$) not less than 27 degrees and not more than 70 degrees at all the measurement points.

Then, the light diffusive sheets of Comparative Examples 1 to 3 were each incorporated into a 15-inch edge light type backlight unit (one cold-cathode tube was provided on each side), and front luminance was measured. That is, the light diffusive sheets of Comparative Examples 1 to 3 were each disposed on a light guide plate so that the rough surface of the light diffusive sheet served as the light emergent surface, and the luminance was measured at each emergent angle for the parallel and perpendicular directions with respect to the light source (cold-cathode tubes) positioned at the center of the backlight unit (1 inch=2.54 cm). The results are shown in Table 6.

TABLE 6

| | | luminance (cd/m²) | | |
|---|---|---|---|---|
| | | Comparative Example 1 | Comparative Example 2 | Comparative Example 3 |
| parallel direction | left 45 degree | 1170 | 1310 | 1250 |
| | left 30 degree | 1540 | 1310 | 1170 |
| | 0 degree | 1560 | 1220 | 1070 |
| | right 30 degree | 1510 | 1310 | 1170 |
| | right 45 degree | 1170 | 1310 | 1240 |
| perpendicular direction | up 45 degree | 1340 | 1620 | 1540 |
| | up 30 degree | 1740 | 1500 | 1320 |
| | 0 degree | 1560 | 1220 | 1070 |
| | down 30 degree | 1700 | 1470 | 1370 |
| | down 45 degree | 1340 | 1580 | 1600 |

As seen from the results shown in Table 6, when the conventional light diffusive sheets were incorporated into the backlight unit, favorable front luminance could not be obtained.

As clearly seen from the results of the aforementioned examples, the light control films of the examples of the present invention exhibited superior front luminance and appropriate light diffusion, because the rough surfaces thereof were designed to satisfy parameters of the present invention. Moreover, by incorporating such light control films into a backlight unit, the backlight units exhibited strong front luminance without glare or an interference pattern.

Examples 9 to 12

Four kinds of molds (9) to (12) on which predetermined convexo-concave profiles were formed by a laser microprocessing technique were prepared, an ultraviolet curing resin having a refractive index of 1.50 was poured into the molds (9) to (11), and a silicone resin having a refractive index of 1.40 was poured into the mold (12). Subsequently, the poured resins were cured, and then taken out from the molds to obtain light control films (9) to (12) having a size of 23 cm (for the direction perpendicular to the light source)×31 cm (for the direction parallel to the light source) (light control films of Examples 9 to 12).

Then, height data of the rough surfaces (light emergent surfaces) of the light control films (9) to (12) were measured by using a laser microscope (VK-9500, KEYENCE CORP.) with an objective lens of magnification ×50. The measurement interval in the plane was about 0.26 μm. Since one field of the objective lens of magnification ×50 is 270 μm×202 μm, an automatic coupling function was used to obtain surface height data of a region of 1 mm×1 mm. The measurement was performed at arbitrary 5 positions on each light control film, and averages of slopes of the curved surfaces to base planes ($\theta_{nv}$) were calculated by using these surface height data. Further, $A_{sk}$ was calculated in accordance with the aforementioned formula (5) by using the same surface height data. The results obtained for the light control films (9) to (12) are shown in Table 1 (unit of slope is "degree"). Further, by using a turbidimeter (NDH2000, Nippon Denshoku), hazes of the light control films (9) to (12) were measured according to JIS K7136:2000. The measurement results are also shown in Table 7.

TABLE 7

|  | $\theta_{nv}$ (degree) | $|A_{sk}|$ | haze (%) |
|---|---|---|---|
| Example 9 | 42.0 | 0.661 | 82.5 |
|  | 43.8 | 0.655 |  |
|  | 41.0 | 0.644 |  |
|  | 40.9 | 0.652 |  |
|  | 41.0 | 0.631 |  |
| Example 10 | 34.1 | 0.661 | 82.6 |
|  | 35.2 | 0.667 |  |
|  | 35.6 | 0.683 |  |
|  | 35.6 | 0.671 |  |
|  | 33.9 | 0.654 |  |
| Example 11 | 29.6 | 0.010 | 79.1 |
|  | 28.2 | 0.038 |  |
|  | 28.6 | 0.104 |  |
|  | 30.5 | 0.098 |  |
|  | 29.7 | 0.103 |  |
| Example 12 | 36.5 | 0.366 | 82.0 |
|  | 34.9 | 0.369 |  |
|  | 35.9 | 0.368 |  |
|  | 35.7 | 0.351 |  |
|  | 38.1 | 0.370 |  |

As seen from the results shown in Table 7, the averages of slopes of the curved surfaces ($\theta_{nv}$) of the light control films of Examples 9 to 12 were not less than 27 degrees and not more than 70 degrees at all the measurement points. Further, none of the absolute values of $A_{sk}$ was more than 1.2. Moreover, all the light control films of Examples 9 to 12 had a haze of 70% or higher, and thus satisfied the optical characteristics required for obtaining favorable front luminance.

Then, the light control films (9) to (12) were each incorporated into a 15-inch edge light type backlight unit (one cold-cathode tube was provided on each side), and front luminance was measured. That is, the light control films (9) to (12) were each disposed on a light guide plate so that the rough surfaces served as the light emergent surfaces, and the luminance was measured at each emergent angle for the parallel and perpendicular directions with respect to the light source (cold-cathode tubes) positioned at the center of the backlight unit (1 inch=2.54 cm). The results obtained for the light control films (9) to (12) are shown in Table 8 (unit is "cd/m²").

TABLE 8

|  |  | luminance (cd/m²) | | | |
|---|---|---|---|---|---|
|  |  | Example 9 | Example 10 | Example 11 | Example 12 |
| parallel direction | left 45 degree | 1040 | 1120 | 1150 | 1130 |
|  | left 30 degree | 1960 | 1740 | 1650 | 1720 |
|  | 0 degree | 2110 | 1810 | 1680 | 1780 |
|  | right 30 degree | 1930 | 1720 | 1630 | 1700 |
|  | right 45 degree | 1060 | 1130 | 1150 | 1130 |
| perpendicular direction | up 45 degree | 903 | 1150 | 1250 | 1170 |
|  | up 30 degree | 2070 | 1870 | 1790 | 1850 |
|  | 0 degree | 2110 | 1810 | 1680 | 1780 |
|  | down 30 degree | 2060 | 1870 | 1800 | 1860 |
|  | down 45 degree | 948 | 1170 | 1270 | 1200 |

It was demonstrated by the results shown in Table 8 that, for the light control films of Examples 9 to 12, only by incorporating one sheet of light control film into the backlight unit, the luminance for emergent angles of 30 degrees or less could be increased, and thus strong light emerged in the front direction.

Examples 13 to 16

Four kinds of molds (13) to (16) on which predetermined convexo-concave profiles were formed by a laser microprocessing technique were prepared, an ultraviolet curing resin having a refractive index of 1.50 was poured into the molds (13) to (15), and a silicone resin having a refractive index of 1.40 was poured into the mold (16). Subsequently, the poured resins were cured, and then taken out from the molds to obtain light control films (13) to (16) having a size of 23 cm×31 cm.

Then, heights of the rough surface (light emergent surfaces) of the light control films (13) to (16) were measured in the same manner as that used in Examples 9 to 12. The measurement was performed at 5 arbitrary positions on each light control film, and averages of slopes of the curved surfaces to base planes ($\theta_{nv}$) were calculated by using the obtained surface height data. Further, $A_{ku}$ was calculated in accordance with the aforementioned formula (6) by using the same surface height data. The results obtained for the light control films (13) to (16) are shown in Table 9 (unit of slope is "degree"). Further, by using a turbidimeter (NDH2000, Nippon Denshoku), the haze of each of the light control films (13) to (16) was measured according to JIS K7136:2000. The measurement results are also shown in Table 9.

TABLE 9

|  | $\theta_{nv}$ (degree) | $A_{ku}$ | haze (%) |
|---|---|---|---|
| Example 13 | 49.6 | 2.072 | 82.8 |
|  | 48.2 | 2.018 |  |
|  | 44.9 | 2.151 |  |
|  | 45.8 | 2.113 |  |
|  | 46.7 | 2.044 |  |
| Example 14 | 40.1 | 4.023 | 76.2 |
|  | 41.1 | 3.910 |  |
|  | 38.2 | 4.005 |  |
|  | 38.5 | 4.102 |  |
|  | 38.9 | 4.146 |  |
| Example 15 | 34.0 | 2.063 | 82.7 |
|  | 35.2 | 2.034 |  |
|  | 32.8 | 1.990 |  |
|  | 33.0 | 2.131 |  |
|  | 34.2 | 2.150 |  |
| Example 16 | 41.5 | 1.710 | 82.6 |
|  | 42.3 | 1.661 |  |
|  | 40.4 | 1.723 |  |
|  | 42.9 | 1.774 |  |
|  | 43.0 | 1.726 |  |

As seen from the results shown in Table 9, the averages of slopes of the curved surfaces ($\theta_{nv}$) of the light control films of Examples 13 to 16 were not less than 27 degrees and not more than 70 degrees at all the measurement points. Further, none of the values of $A_{ku}$ were less than 1.5 or more than 5.0. Moreover, all the light control films of Examples 13 to 16 had a haze of 70% or higher, and thus satisfied the optical characteristics required for obtaining favorable front luminance.

Then, the light control films (13) to (16) were each incorporated into a 15-inch edge light type backlight unit (one cold-cathode tube was provided on each side), and front luminance was measured. That is, the light control films (13) to (16) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (13) to (16) are shown in Table 10 (unit is "cd/m$^2$").

TABLE 10

| | | luminance (cd/m$^2$) | | | |
|---|---|---|---|---|---|
| | | Example 13 | Example 14 | Example 15 | Example 16 |
| parallel direction | left 45 degree | 1050 | 1130 | 1150 | 1120 |
| | left 30 degree | 1950 | 1690 | 1630 | 1740 |
| | 0 degree | 2100 | 1740 | 1650 | 1810 |
| | right 30 degree | 1920 | 1670 | 1610 | 1720 |
| | right 45 degree | 1060 | 1140 | 1160 | 1130 |
| perpendicular direction | up 45 degree | 911 | 1200 | 1270 | 1150 |
| | up 30 degree | 2070 | 1830 | 1770 | 1870 |
| | 0 degree | 2100 | 1740 | 1650 | 1810 |
| | down 30 degree | 2050 | 1830 | 1780 | 1880 |
| | down 45 degree | 956 | 1220 | 1300 | 1170 |

It was demonstrated by the results shown in Table 10 that, for the light control films of Examples 13 to 16, only by incorporating one sheet of light control film into the backlight unit, the luminance for emergent angles of 30 degrees or less could be increased, and thus strong light emerged in the front direction.

Comparative Examples 4 to 6

Three kinds of molds (17) to (19) on which predetermined convexo-concave profiles were formed by a laser microprocessing technique were prepared, and an ultraviolet curing resin having a refractive index of 1.50 was poured into the molds. Subsequently, the poured resin was cured, and then taken out from the molds to obtain light control films (17) to (19) having a size of 23 cm×31 cm (light control films of Comparative Examples 4 to 6).

Then, heights of the rough surface (light emergent surfaces) of the light control films (17) to (19) were measured in the same manner as that used in Examples 9 to 12. The measurement was performed at 5 arbitrary positions on each light control film, and averages of slopes of the curved surfaces to base planes ($\theta_{nv}$) were calculated by using the obtained surface height data. Further, $A_{sk}$ was calculated in accordance with the aforementioned formula (5) by using the same surface height data. The results obtained for the light control films (17) to (19) are shown in Table 11 (unit of slope is "degree").

TABLE 11

| | $\theta_{nv}$ (degree) | $|A_{sk}|$ | haze (%) |
|---|---|---|---|
| Comparative Example 4 | 33.8 | 1.272 | 81.2 |
| | 33.0 | 1.258 | |
| | 35.5 | 1.286 | |
| | 34.8 | 1.269 | |
| | 32.2 | 1.269 | |
| Comparative Example 5 | 41.5 | 1.479 | 81.3 |
| | 40.2 | 1.435 | |
| | 42.1 | 1.452 | |
| | 40.8 | 1.450 | |
| | 40.2 | 1.456 | |
| Comparative Example 6 | 47.7 | 1.408 | 74.5 |
| | 45.7 | 1.398 | |
| | 50.1 | 1.388 | |
| | 49.8 | 1.429 | |
| | 48.5 | 1.404 | |

As seen from the results shown in Table 11, the averages of slopes of the curved surfaces ($\theta_{nv}$) of the light control films (17) to (19) were not less than 27 degrees and not more than 70 degrees at all the measurement points. However, all the values of $A_{sk}$ were more than 1.2.

Then, the light control films (17) to (19) were each incorporated into a 15-inch edge light type backlight unit (one cold-cathode tube was provided on each side), and front luminance was measured. That is, the light control films (17) to (19) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (17) to (19) are shown in Table 12 (unit is "cd/m$^2$").

TABLE 12

| | | luminance (cd/m$^2$) | | |
|---|---|---|---|---|
| | | Comparative Example 4 | Comparative Example 5 | Comparative Example 6 |
| parallel direction | left 45 degree | 1230 | 1210 | 1200 |
| | left 30 degree | 1420 | 1460 | 1500 |
| | 0 degree | 1370 | 1420 | 1480 |
| | right 30 degree | 1420 | 1450 | 1500 |
| | right 45 degree | 1220 | 1210 | 1200 |
| perpendicular direction | up 45 degree | 1500 | 1460 | 1420 |
| | up 30 degree | 1590 | 1620 | 1660 |
| | 0 degree | 1370 | 1420 | 1480 |
| | down 30 degree | 1600 | 1630 | 1670 |
| | down 45 degree | 1500 | 1470 | 1420 |

From the results shown in Table 12, it was found that when the light control films of Comparative Examples 4 to 6 were incorporated into a backlight unit, front luminance was insufficient.

Comparative Examples 7 to 9

Three kinds of molds (20) to (22) on which predetermined convexo-concave profiles were formed by a laser microprocessing technique were prepared, and an ultraviolet curing resin having a refractive index of 1.50 was poured into the molds. Subsequently, the poured resin was cured, and then taken out from the molds to obtain light control films (20) to (22) having a size of 23 cm×31 cm (light control films of Comparative Examples 7 to 9).

Then, heights of the rough surface (light emergent surfaces) of the light control films (20) to (22) were measured in the same manner as that used in Examples 9 to 12. The measurement was performed at 5 arbitrary positions on each light control film, and averages of slopes of the curved surfaces to base planes ($\theta_{nv}$) were calculated by using the obtained surface height data. Further, $A_{ku}$ was calculated in accordance with the aforementioned formula (6) by using the same surface height data. The results obtained for the light control films (20) to (22) are shown in Table 13 (unit of slope is "degree").

TABLE 13

| | $\theta_{nv}$ (degree) | $A_{ku}$ | haze (%) |
|---|---|---|---|
| Comparative Example 7 | 28.3 | 1.312 | 70.3 |
| | 28.8 | 1.258 | |
| | 29.0 | 1.281 | |
| | 27.7 | 1.338 | |
| | 29.2 | 1.361 | |
| Comparative Example 8 | 33.4 | 1.395 | 76.9 |
| | 34.6 | 1.302 | |
| | 33.6 | 1.391 | |
| | 34.8 | 1.400 | |
| | 34.9 | 1.393 | |
| Comparative Example 9 | 38.7 | 7.198 | 70.6 |
| | 37.4 | 7.270 | |
| | 39.6 | 7.165 | |
| | 39.9 | 7.053 | |
| | 38.6 | 7.197 | |

As seen from the results shown in Table 13, the averages of slopes of the curved surfaces ($\theta_{nv}$) of the light control films (20) to (22) were not less than 27 degrees and not more than 70 degrees at all the measurement points. However, all the values of $A_{ku}$ were either less than 1.5 or more than 5.0.

Then, the light control films (20) to (22) were each incorporated into a 15-inch edge light type backlight unit (one cold-cathode tube was provided on each side), and front luminance was measured. That is, the light control films (20) to (22) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (20) to (22) are shown in Table 14 (unit is "cd/m²").

TABLE 14

| | | luminance (cd/m²) | | |
|---|---|---|---|---|
| | | Comparative Example 7 | Comparative Example 8 | Comparative Example 9 |
| parallel direction | left 45 degree | 1270 | 1220 | 1240 |
| | left 30 degree | 1310 | 1450 | 1390 |
| | 0 degree | 1210 | 1400 | 1320 |
| | right 30 degree | 1310 | 1440 | 1390 |
| | right 45 degree | 1260 | 1210 | 1230 |
| perpendicular direction | up 45 degree | 1630 | 1480 | 1550 |
| | up 30 degree | 1480 | 1610 | 1550 |
| | 0 degree | 1210 | 1400 | 1320 |
| | down 30 degree | 1500 | 1620 | 1570 |
| | down 45 degree | 1620 | 1480 | 1540 |

From the results shown in Table 14, it was found that when the light control films of Comparative Examples 7 to 9 were incorporated into a backlight unit, front luminance was insufficient.

Comparative Examples 10 and 11

For commercially available light diffusive sheets (Comparative Examples 10 and 11), rough surfaces (light emergent surfaces) were measured in the same manner as in the foregoing Examples at 5 arbitrary positions on each sheet, and averages of slopes of the curved surfaces ($\theta_{nv}$) were obtained. Further, $A_{sk}$ and $A_{ku}$ were calculated in accordance with the aforementioned formulas (5) and (6), respectively, by using the same surface height data. The results obtained for the light diffusive sheets of Comparative Examples 10 and 11 are shown in Table 15.

TABLE 15

| | $\theta_{nv}$ (degree) | $|A_{sk}|$ | $A_{ku}$ |
|---|---|---|---|
| Comparative Example 10 | 25.3 | 0.131 | 3.321 |
| | 26.3 | 0.134 | 3.282 |
| | 26.3 | 0.128 | 3.409 |
| | 24.8 | 0.125 | 3.259 |
| | 24.2 | 0.135 | 3.353 |
| Comparative Example 11 | 16.8 | 0.730 | 3.661 |
| | 16.6 | 0.733 | 3.803 |
| | 17.4 | 0.741 | 3.823 |
| | 17.5 | 0.759 | 3.808 |
| | 17.0 | 0.704 | 3.688 |

As seen from the results shown in Table 15, the light diffusive sheets of Comparative Examples 10 and 11 did not provide an average of slopes of the curved surface ($\theta_{nv}$) not less than 27 degrees and not more than 70 degrees at all the measurement points.

Then, the light diffusive sheets of Comparative Examples 10 and 11 were each incorporated into a 15-inch edge light type backlight unit (one cold-cathode tube was provided for each of upside and downside), and front luminance was measured. That is, the light diffusive sheets of Comparative Examples 10 and 11 were each disposed on a light guide plate so that the rough surface should serve as the light emergent surface, and the luminance was measured at each emergent angle for the parallel and perpendicular directions with respect to the light source (cold-cathode tubes) at the center of the backlight unit (1 inch=2.54 cm). The results are shown in Table 16.

TABLE 16

|  |  | luminance(cd/m²) | |
|---|---|---|---|
|  |  | Comparative Example 10 | Comparative Example 11 |
| parallel direction | left 45 degree | 1180 | 1260 |
|  | left 30 degree | 1560 | 1330 |
|  | 0 degree | 1560 | 1240 |
|  | right 30 degree | 1550 | 1330 |
|  | right 45 degree | 1180 | 1250 |
| perpendicular direction | up 45 degree | 1350 | 1610 |
|  | up 30 degree | 1710 | 1500 |
|  | 0 degree | 1560 | 1240 |
|  | down 30 degree | 1720 | 1520 |
|  | down 45 degree | 1360 | 1600 |

As seen from the results shown in Table 16, when the conventional light diffusive sheets were incorporated into a backlight unit, favorable front luminance could not be obtained.

As clearly seen from the results of the aforementioned examples, the light control films of the examples of the present invention exhibited superior front luminance and appropriate light diffusion, because the rough surfaces thereof were designed to satisfy the specific parameters of the present invention. Further, by incorporating such light control films into a backlight unit, backlight units exhibiting high front luminance without glare or an interference pattern could be obtained.

Examples 17 to 20

Four kinds of molds (23) to (26) on which predetermined convexo-concave profiles were formed by a laser microprocessing technique were prepared, an ultraviolet curing resin having a refractive index of 1.50 was poured into the molds (23) to (25), and a silicone resin having a refractive index of 1.40 was poured into the mold (26). Subsequently, the poured resins were cured, and then taken out from the molds to obtain light control films (23) to (26) having a size of 23 cm (for the direction perpendicular to the light source)×31 cm (for the direction parallel to the light source) (light control films of Examples 17 to 20).

Then, heights of the rough surface (light emergent surfaces) of the light control films (23) to (26) were measured by using a laser microscope (VK-9500, KEYENCE CORP.) with an objective lens of magnification ×50. The measurement interval in the plane was about 0.26 μm. Since one field of the objective lens of magnification ×50 is 270 μm×202 μm, an automatic connecting function was used to obtain surface height data of a region of 1 mm×1 mm. The measurement was performed at 5 arbitrary positions on each light, control film, surface areas of the rough surfaces (A2) were obtained by using the obtained surface height data, and the ratios ($A_r$=A2/A1) to the orthogonal projections of the measured rough surfaces (A1) were calculated. Further, $A_{sk}$ was calculated in accordance with the aforementioned formula (5) by using the same surface height data. The results obtained for the light control films (23) to (26) are shown in Table 17. Further, measurement results of haze of each of the light control films (23) to (26), measured by using a turbidimeter (NDH2000, Nippon Denshoku) according to JIS K7136:2000, are also shown in Table 17.

TABLE 17

|  | $A_r$ | $|A_{sk}|$ | haze (%) |
|---|---|---|---|
| Example 17 | 2.239 | 0.097 | 82.8 |
|  | 2.144 | 0.124 |  |
|  | 2.241 | 0.109 |  |
|  | 2.306 | 0.049 |  |
|  | 2.208 | 0.117 |  |
| Example 18 | 1.780 | 0.792 | 82.8 |
|  | 1.834 | 0.820 |  |
|  | 1.705 | 0.761 |  |
|  | 1.708 | 0.798 |  |
|  | 1.801 | 0.826 |  |
| Example 19 | 1.432 | 0.260 | 81.0 |
|  | 1.489 | 0.255 |  |
|  | 1.389 | 0.248 |  |
|  | 1.423 | 0.260 |  |
|  | 1.500 | 0.254 |  |
| Example 20 | 1.843 | 0.020 | 81.7 |
|  | 1.773 | 0.028 |  |
|  | 1.816 | 0.027 |  |
|  | 1.894 | 0.018 |  |
|  | 1.823 | 0.012 |  |

As seen from the results shown in Table 17, the surface area ratios $A_r$ of the light control films (23) to (26) of Examples 17 to 20 were not less than 1.2 and not more than 2.5 at all the measurement points. Further, none the absolute values of $A_{sk}$ was more than 1.2. Moreover, all the light control films of Examples 17 to 20 had a haze of 70% or higher, and thus satisfied the optical characteristics required for obtaining favorable front luminance.

Then, the light control films (23) to (26) were each incorporated into a 15-inch edge light type backlight unit (one cold-cathode tube was provided on each side), and front luminance was measured. That is, the light control films (23) to (26) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (23) to (26) are shown in Table 18 (unit is "cd/m²").

TABLE 18

|  |  | luminance (cd/m²) | | | |
|---|---|---|---|---|---|
|  |  | Example 17 | Example 18 | Example 19 | Example 20 |
| parallel direction | left 45 degree | 1110 | 1100 | 1070 | 1110 |
|  | left 30 degree | 1750 | 1790 | 1870 | 1760 |
|  | 0 degree | 1830 | 1880 | 1990 | 1840 |
|  | right 30 degree | 1740 | 1770 | 1850 | 1740 |
|  | right 45 degree | 1120 | 1110 | 1090 | 1120 |

TABLE 18-continued

| | | luminance (cd/m²) | | | |
|---|---|---|---|---|---|
| | | Example 17 | Example 18 | Example 19 | Example 20 |
| perpendicular direction | up 45 degree | 1130 | 1090 | 1000 | 1120 |
| | up 30 degree | 1890 | 1920 | 1990 | 1890 |
| | 0 degree | 1830 | 1880 | 1990 | 1840 |
| | down 30 degree | 1890 | 1920 | 1990 | 1900 |
| | down 45 degree | 1160 | 1120 | 1040 | 1150 |

It was demonstrated by the results shown in Table 18 that, for the light control films (23) to (26) of Examples 17 to 20, only by incorporating one sheet of light control film into the backlight unit, the luminance for emergent angles of 30 degrees or less could be increased, and thus strong light emerged in the front direction.

Examples 21 to 24

Four kinds of molds (27) to (30) on which predetermined convexo-concave profiles were formed by a laser microprocessing technique were prepared, an ultraviolet curing resin having a refractive index of 1.50 was poured into the molds (27) to (29), and a silicone resin having a refractive index of 1.40 was poured into the mold (30). Subsequently, the poured resins were cured, and then taken out from the molds to obtain light control films (27) to (30) having a size of 23 cm×31 cm (light control films of Examples 21 to 24).

Then, heights of the rough surface (light emergent surfaces) of the light control films (27) to (30) were measured in the same manner as that used in Examples 17 to 20. The measurement was performed at 5 arbitrary positions on each light control film, and surface areas of the rough surfaces (A2) were obtained by using the obtained surface height data, and the ratios ($A_r$=A2/A1) to the orthogonal projections of the measured rough surfaces (A1) were calculated. Further, $A_{ku}$ was calculated in accordance with the aforementioned formula (6) by using the same surface height data. The results obtained for the light control films (27) to (30) are shown in Table 19 (unit of slope is "degree"). Further, by using a turbidimeter (NDH2000, Nippon Denshoku), the haze of each of the light control films (27) to (30) was measured according to JIS K7136:2000. The measurement results are also shown in Table 19.

TABLE 19

| | $A_r$ | $A_{ku}$ | haze (%) |
|---|---|---|---|
| Example 21 | 1.452 | 1.594 | 78.4 |
| | 1.403 | 1.536 | |
| | 1.446 | 1.590 | |
| | 1.500 | 1.548 | |
| | 1.408 | 1.593 | |
| Example 22 | 1.622 | 1.925 | 82.6 |
| | 1.686 | 1.946 | |
| | 1.683 | 1.837 | |
| | 1.554 | 1.960 | |
| | 1.584 | 1.890 | |
| Example 23 | 2.239 | 1.747 | 82.0 |
| | 2.229 | 1.728 | |
| | 2.179 | 1.787 | |
| | 2.217 | 1.783 | |
| | 2.257 | 1.830 | |

TABLE 19-continued

| | $A_r$ | $A_{ku}$ | haze (%) |
|---|---|---|---|
| Example 24 | 1.780 | 2.590 | 82.8 |
| | 1.727 | 2.562 | |
| | 1.848 | 2.638 | |
| | 1.863 | 2.592 | |
| | 1.861 | 2.480 | |

As seen from the results shown in Table 19, the surface area ratios $A_r$ of the light control films of Examples 21 to 24 were not less than 1.2 and not more than 2.5 at all the measurement points. Further, all the values of $A_{ku}$ were not less than 1.5 and not more than 5.0. Moreover, all the light control films (27) to (30) of Examples 21 to 24 had a haze of 70% or higher, and thus satisfied the optical characteristics required for obtaining favorable front luminance.

Then, the light control films (27) to (30) were each incorporated into a 15-inch edge light type backlight unit (one cold-cathode tube was provided on each side), and front luminance was measured. That is, the light control films (27) to (30) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (27) to (30) are shown in Table 20 (unit is "cd/m²").

TABLE 20

| | | luminance (cd/m²) | | | |
|---|---|---|---|---|---|
| | | Example 21 | Example 22 | Example 23 | Example 24 |
| parallel direction | left 45 degree | 1060 | 1100 | 1110 | 1100 |
| | left 30 degree | 1890 | 1790 | 1740 | 1780 |
| | 0 degree | 2030 | 1880 | 1830 | 1860 |
| | right 30 degree | 1870 | 1770 | 1730 | 1760 |
| | right 45 degree | 1080 | 1110 | 1120 | 1110 |
| perpendicular direction | up 45 degree | 968 | 1090 | 1130 | 1110 |
| | up 30 degree | 2020 | 1920 | 1890 | 1900 |
| | 0 degree | 2030 | 1880 | 1830 | 1860 |
| | down 30 degree | 2010 | 1900 | 1890 | 1910 |
| | down 45 degree | 1000 | 1110 | 1160 | 1120 |

It was demonstrated by the results shown in Table 20 that, for the light control films of Examples 21 to 24, only by incorporating one sheet of light control film into the backlight unit, could the luminance for emergent angles of 30 degrees or less could be increased, and thus strong light emerged in the front direction.

Comparative Examples 12 to 14

Three kinds of molds (31) to (33) on which predetermined convexo-concave profiles were formed by a laser microprocessing technique were prepared, and an ultraviolet curing resin having a refractive index of 1.50 was poured into the molds. Subsequently, the poured resin was cured, and then taken out from the molds to obtain light control films (31) to (33) having a size of 23 cm×31 cm (light control films of Comparative Examples 12 to 14).

Then, heights of the rough surface (light emergent surfaces) of the light control films (31) to (33) were measured in the same manner as that used in Examples 17 to 20. The measurement was performed at 5 arbitrary positions on each light control film, surface areas of the rough surfaces (A2) were obtained by using the obtained surface height data, and the ratios ($A_r$=A2/A1) to the orthogonal projections of the measured rough surfaces (A1) were calculated. Further, $A_{sk}$ was calculated in accordance with the aforementioned formula (5) by using the same surface height data. The results obtained for the light control films (31) to (33) are shown in Table 21 (unit of slope is "degree").

TABLE 21

| | $A_r$ | $|A_{sk}|$ | haze (%) |
|---|---|---|---|
| Comparative Example 12 | 1.413 | 2.159 | 78.7 |
| | 1.386 | 2.246 | |
| | 1.434 | 2.146 | |
| | 1.462 | 2.091 | |
| | 1.448 | 2.056 | |
| Comparative Example 13 | 1.658 | 1.479 | 81.2 |
| | 1.625 | 1.518 | |
| | 1.578 | 1.493 | |
| | 1.716 | 1.456 | |
| | 1.639 | 1.447 | |
| Comparative Example 14 | 2.401 | 1.755 | 70.4 |
| | 2.469 | 1.637 | |
| | 2.294 | 1.749 | |
| | 2.498 | 1.824 | |
| | 2.342 | 1.758 | |

As seen from the results shown in Table 21, the surface area ratios $A_r$ of the light control films (31) to (33) of Comparative Examples 12 to 14 were not less than 1.2 and not more than 2.5 at all the measurement points. However, all the absolute values of $A_{sk}$ were more than 1.2.

Then, the light control films (31) to (33) were each incorporated into a 15-inch edge light type backlight unit (one cold-cathode tube was provided on each side), and front luminance was measured. That is, the light control films (31) to (33) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (31) to (33) are shown in Table 22 (unit is "cd/m²").

TABLE 22

| | | luminance (cd/m²) | | |
|---|---|---|---|---|
| | | Comparative Example 12 | Comparative Example 13 | Comparative Example 14 |
| parallel direction | left 45 degree | 1240 | 1210 | 1220 |
| | left 30 degree | 1380 | 1470 | 1430 |
| | 0 degree | 1320 | 1430 | 1380 |
| | right 30 degree | 1380 | 1460 | 1420 |
| | right 45 degree | 1230 | 1210 | 1210 |

TABLE 22-continued

| | | luminance (cd/m²) | | |
|---|---|---|---|---|
| | | Comparative Example 12 | Comparative Example 13 | Comparative Example 14 |
| perpendicular direction | up 45 degree | 1540 | 1450 | 1490 |
| | up 30 degree | 1550 | 1620 | 1590 |
| | 0 degree | 1320 | 1430 | 1380 |
| | down 30 degree | 1570 | 1630 | 1600 |
| | down 45 degree | 1540 | 1450 | 1490 |

From the results shown in Table 22, it was found that when the light control films of Comparative Examples 12 to 14 were incorporated into a backlight unit, front luminance was insufficient.

Comparative Examples 15 to 17

Three kinds of molds (34) to (36) on which predetermined convexo-concave profiles were formed by a laser microprocessing technique were prepared, and an ultraviolet curing resin having a refractive index of 1.50 was poured into the molds. Subsequently, the poured resin was cured, and then taken out from the molds to obtain light control films (34) to (36) having a size of 23 cm×31 cm (light control films of Comparative Examples 15 to 17).

Then, heights of the rough surface (light emergent surfaces) of the light control films (34) to (36) were measured in the same manner as that used in the examples. The measurement was performed at 5 arbitrary positions on each light control film, surface areas of the rough surfaces (A2) were obtained by using the obtained surface height data, and the ratios ($A_r$=A2/A1) to the orthogonal projections of the measured rough surfaces (A1) were calculated. Further, $A_{ku}$ was calculated in accordance with the aforementioned formula (6) by using the same surface height data. The results obtained for the light control films (34) to (36) are shown in Table 23 (unit of slope is "degree").

TABLE 23

| | $A_r$ | $A_{ku}$ | haze (%) |
|---|---|---|---|
| Comparative Example 15 | 2.034 | 7.270 | 71.0 |
| | 2.025 | 7.576 | |
| | 2.003 | 7.249 | |
| | 2.042 | 6.935 | |
| | 2.118 | 7.475 | |
| Comparative Example 16 | 1.565 | 1.351 | 72.8 |
| | 1.519 | 1.301 | |
| | 1.571 | 1.334 | |
| | 1.595 | 1.403 | |
| | 1.612 | 1.307 | |
| Comparative Example 17 | 1.392 | 1.312 | 72.2 |
| | 1.441 | 1.310 | |
| | 1.348 | 1.319 | |
| | 1.413 | 1.349 | |
| | 1.404 | 1.250 | |

As seen from the results shown in Table 23, the surface area ratios $A_r$ of the light control films of Comparative Examples 15 to 17 were not less than 1.2 and not more than 2.5 at all the measurement points. However, all the values of $A_{ku}$ were either less than 1.5 or more than 5.0.

Then, the light control films (34) to (36) were each incorporated into a 15-inch edge light type backlight unit (one cold-cathode tube was provided on each side), and front luminance was measured. That is, the light control films (34) to (36) were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (34) to (36) are shown in Table 24 (unit is "cd/m$^2$").

TABLE 24

|  |  | luminance (cd/m$^2$) | | |
|---|---|---|---|---|
|  |  | Comparative Example 15 | Comparative Example 16 | Comparative Example 17 |
| parallel direction | left 45 degree | 1220 | 1210 | 1270 |
|  | left 30 degree | 1460 | 1480 | 1310 |
|  | 0 degree | 1410 | 1440 | 1210 |
|  | right 30 degree | 1450 | 1470 | 1310 |
|  | right 45 degree | 1220 | 1210 | 1260 |
| perpendicular direction | up 45 degree | 1480 | 1450 | 1640 |
|  | up 30 degree | 1620 | 1640 | 1480 |
|  | 0 degree | 1410 | 1440 | 1210 |
|  | down 30 degree | 1630 | 1650 | 1510 |
|  | down 45 degree | 1470 | 1450 | 1630 |

From the results shown in Table 24, it was found that when the light control films of Comparative Examples 15 to 17 were incorporated into a backlight unit, front luminance was insufficient.

Comparative Examples 18 and 19

For commercially available light diffusive sheets (Comparative Examples 18 and 19), heights on the rough surfaces (light emergent surfaces) were measured in the same manner as in the Examples at 5 arbitrary positions on each sheet, areas of the rough surfaces (A2) were obtained, and the ratios (A$_r$=A2/A1) to the orthogonal projections of the measured rough surfaces (A1) were calculated. Further, A$_{sk}$ and A$_{ku}$ were calculated in accordance with the aforementioned formulas (5) and (6), respectively, by using the same surface height data. The results obtained for the light diffusive sheets of Comparative Examples 18 and 19 are shown in Table 25.

TABLE 25

|  | A$_r$ | |A$_{sk}$| | A$_{ku}$ |
|---|---|---|---|
| Comparative Example 18 | 1.157 | 0.178 | 3.441 |
|  | 1.107 | 0.170 | 3.559 |
|  | 1.166 | 0.179 | 3.578 |
|  | 1.117 | 0.184 | 3.584 |
|  | 1.156 | 0.186 | 3.309 |
| Comparative Example 19 | 1.069 | 0.722 | 3.671 |
|  | 1.029 | 0.707 | 3.721 |
|  | 1.081 | 0.748 | 3.697 |
|  | 1.109 | 0.718 | 3.508 |
|  | 1.098 | 0.724 | 3.740 |

As seen from the results shown in Table 25, the light control films of Comparative Examples 18 and 19 did not have a surface area ratio A$_r$ not less than 1.2 and not more than 2.5 at all the measurement points.

Then, the light diffusive sheets of Comparative Examples 18 and 19 were each incorporated into a 15-inch edge light type backlight unit (one cold-cathode tube was provided on each side), and front luminance was measured. That is, the light diffusive sheets of Comparative Examples 18 and 19 were each disposed on a light guide plate so that the rough surface served as the light emergent surface, and the luminance was measured at each emergent angle for the parallel and perpendicular directions with respect to the light source (cold-cathode tubes) positioned at the center of the backlight unit (1 inch=2.54 cm). The results are shown in Table 26.

TABLE 26

|  |  | luminance (cd/m$^2$) | |
|---|---|---|---|
|  |  | Comparative Example 18 | Comparative Example 19 |
| parallel direction | left 45 degree | 1180 | 1260 |
|  | left 30 degree | 1560 | 1330 |
|  | 0 degree | 1560 | 1240 |
|  | right 30 degree | 1550 | 1330 |
|  | right 45 degree | 1180 | 1250 |
| perpendicular direction | up 45 degree | 1350 | 1610 |
|  | up 30 degree | 1710 | 1500 |
|  | 0 degree | 1560 | 1240 |
|  | down 30 degree | 1720 | 1520 |
|  | down 45 degree | 1360 | 1600 |

As seen from the results shown in Table 26, when the conventional light diffusive sheets were incorporated into a backlight unit, favorable front luminance could not be obtained.

Moreover, for the light control films of Examples 1 to 24, absolute values of averages ($\phi_{ave}$) of angles ($\phi$, −180 degrees<$\phi$≦180 degrees) between orthogonal projections of normals of curved surfaces of the rough surfaces projected on base planes and one side of predetermined approximately square regions were calculated. Specifically, for a square region (1 mm×1 mm) determined at one arbitrary position on each of the light control films of Examples 1 to 24, the surface profile was measured in the same manner as that used in Examples 1 to 24, and the curved surface of the rough surface was approximated on the basis of the measured height data. The angles $\phi$ between orthogonal projections of normals at predetermined multiple points of the curved surfaces projected on a base plane and one side of the predetermined square region were obtained, the average thereof, $\phi_{ave}$, was calculated, and the absolute values thereof were obtained. The absolute value of $\phi_{ave}$ 5 or less for all the light control films of Examples 1 to 24. Furthermore, also with height data obtained by rotating the square region within the film around the center of the region as a rotation axis, the absolute value of $\phi_{ave}$ was 5 or less irrespective of the orientation direction of the square region.

Figure 14:
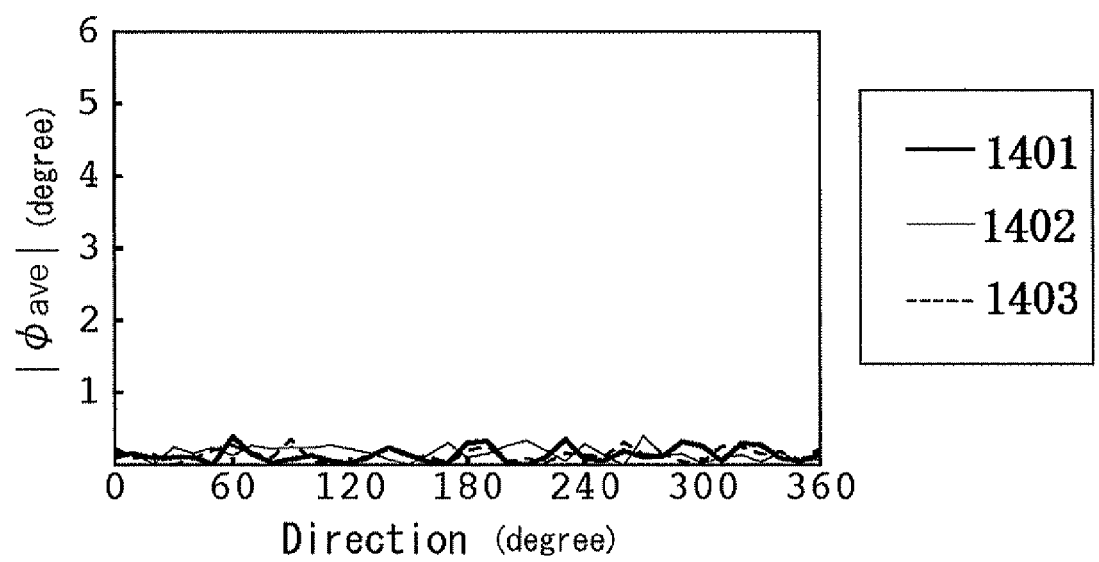
FIG. 14 is a graph illustrating the relationship between the absolute values of (pave measured for the light control films of Examples 1, 9 and 17 and orientation of the determined square region.

Taking the light control films of Examples 1, 9 and 17 as typical examples, change in the absolute value of $\phi_{ave}$ observed when the direction of the determined square was turned by 10 degrees at a time, through 360 degrees, is shown in the graph of FIG. 14. In FIG. 14, the vertical axis represents the absolute value of $\phi_{ave}$, the horizontal axis represents the direction (degrees turned) based on the original position of the square region, the thick line 1401 represents the result for the light control film of Example 1, thin line 1402 represents that of Example 9, and the dashed line 1403 represents that of Example 17. As seen from the results shown in the graph of FIG. 14, all the absolute values of $\phi_{ave}$ of the light control films of Examples 1, 9 and 17 were less than 0.5 degree even at the maximum, and the absolute value of $\phi_{ave}$ was not more than 5 degrees.

Since the absolute value of $\phi_{ave}$ was not more than 5 degrees for any direction of the determined square region on the light control films of Examples 1 to 24 as described above, they did not cause glare when they were incorporated into backlight units.

As clearly seen from the results of the aforementioned examples, the light control films of the examples of the present invention exhibited superior front luminance and appropriate light diffusion, because the rough surfaces thereof were designed to satisfy the specific parameters of the present invention. Moreover, by incorporating such light control films into a backlight unit, backlight units exhibiting strong front luminance without glare or an interference pattern were provided.

The invention claimed is:

1. A light control film having a rough surface, wherein, for a curved surface of the rough surface in an approximately square region having an area of 1 mm² or larger defined at an arbitrary position on the rough surface, by using height data of the rough surface measured at predetermined intervals in the longitudinal and transverse directions in the approximately square region, an average of slopes of the curved surface $\theta_{nv}$ of the rough surface with respect to a base plane of the film is not less than 27 degrees and not more than 70 degrees at substantially any position on the light control film.

2. A light control film having a rough surface formed by a patterned layer comprising a material having a refractive index n, wherein, for a curved surface of the rough surface in an approximately square region having an area of 1 mm² or larger defined at an arbitrary position on the rough surface, by using height data of the rough surface measured in predetermined intervals in the longitudinal and transverse directions in the approximately square region, an average of slopes of the curved surface $\theta_{nv}$ of the rough surface with respect to a base plane of the film is not less than 59−20n degrees and not more than 70 degrees at any position on the light control film.

3. A light control film having a rough surface, wherein, for a curved surface of the rough surface in an approximately square region having an area of 1 mm² or larger defined at an arbitrary position on the rough surface, by using height data of the rough surface measured at predetermined intervals in the longitudinal and transverse directions in the approximately square region, an average of slopes of the curved surface $\theta_{nv}$ of the rough surface with respect to a base plane of the film and a ratio $A_r = A2/A1$ of an area A1 of the approximately square region and a surface area A2 of the approximated curved surface of the rough surface satisfy the following equation 1 or 2 at substantially any position on the light control film $$\theta_{nv} \div A_r \geq 22 \tag{1}$$

$$30 \leq \theta_{nv} \times A_r \leq 140 \tag{2}$$

4. A light control film having a rough surface formed by a patterned layer comprising a material having a refractive index n, wherein, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, an average of slopes of the curved surface $\theta_{nv}$ of the rough surface with respect to a base plane of the film and a ratio A2/A1 of an area A1 of the approximately square region and a surface area A2 of the approximated curved surface of the rough surface satisfy the following equation 3 or 4 at substantially any position on the light control film $$\theta_{nv} \div A_r \times n^2 \geq 35 \tag{3}$$

$$60 \leq \theta_{nv} \times A_r \times n^2 \leq 350 \tag{4}$$

5. A light control film having a rough surface, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, an average of slopes of the curved surface $\theta_{nv}$ of the rough surface with respect to a base plane of the film is not less than 27 degrees and not more than 70 degrees, and an absolute value of a numerical value $A_{sk}$ calculated in accordance with the equation 5 by using all the height data of the rough surface is not more than 1.2 is satisfied at substantially any position on the light control film $$A_{sk} = \frac{\sum_{i=1}^{m} z_i^3}{m} \bigg/ \sqrt{\frac{\sum_{i=1}^{m} z_i^2}{m}}^3 \tag{5}$$

wherein, in the equation 5, $z_i$ represents a value obtained by subtracting a height of average plane of the rough surface from a measured surface height, and m represents a number of measurement points.

6. A light control film having a rough surface formed by a patterned layer comprising a material having a refractive index n, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, an average of slopes of the curved surface $\theta_{nv}$ of the rough surface with respect to a base plane of the film is not less than 59−20n degrees and not more than 70 degrees, and an absolute value of a numerical value $A_{sk}$ calculated in accordance with the equation 5 by using all the height data of the rough surface is not more than 1.2 is satisfied at substantially any position on the light control film $$A_{sk} = \frac{\sum_{i=1}^{m} z_i^3}{m} \bigg/ \sqrt{\frac{\sum_{i=1}^{m} z_i^2}{m}}^3 \tag{5}$$

wherein, in the equation 5, $z_i$ represents a value obtained by subtracting a height of average plane of the rough surface from a measured surface height, and m represents a number of measurement points.

7. A light control film having a rough surface, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, an average of slopes of the curved surface ($\theta_{nv}$ (degree)) of the rough surface with respect to a base plane of the film is not less than 27 degrees and not more than 70 degrees, and a numerical value ($A_{ku}$) calculated in accordance with the equation (6) by using all the height data of the rough surface is not less than 1.5 and not more than 5.0 is satisfied at substantially any position on the light control film.

[#3]

$$A_{ku} = \frac{\sum_{i=1}^{m} z_i^4}{m} \Big/ \sqrt{\frac{\sum_{i=1}^{m} z_i^2}{m}}^4 \quad (6)$$

8. A light control film having a rough surface formed by a patterned layer comprising a material having a refractive index n, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, an average of slopes of the curved surface $\theta_{nv}$ of the rough surface with respect to a base plane of the film is not less than 59−20n degrees and not more than 70 degrees, and a numerical value $A_{ku}$ calculated in accordance with the equation 6 by using all the height data of the rough surface is not less than 1.5 and not more than 5.0 is satisfied at substantially any position on the light control film $$A_{ku} = \frac{\sum_{i=1}^{m} z_i^4}{m} \Big/ \sqrt{\frac{\sum_{i=1}^{m} z_i^2}{m}}^4 \quad (6)$$

wherein, in the equation 6, $z_i$ represents a value obtained by subtracting a height of average plane of the rough surface from a measured surface height, and m represents a number of measurement points.

9. A light control film having a rough surface, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, a ratio $A_r=A2/A1$ of an area A1 of the approximately square region and a surface area A2 of the approximated curved surface of the rough surface is not less than 1.2 and not more than 2.5, and absolute value of a numerical value $A_{sk}$ calculated in accordance with the equation (5) by using all the height data of the rough surface is not more than 1.2 is satisfied a substantially any position on the light control film $$A_{sk} = \frac{\sum_{i=1}^{m} z_i^3}{m} \Big/ \sqrt{\frac{\sum_{i=1}^{m} z_i^2}{m}}^3 \quad (5)$$

wherein, in the equation 5, $z_i$ represents a value obtained by subtracting a height of average plane of the rough surface from a measured surface height, and m represents a number of measurement points.

10. A light control film having a rough surface formed by a patterned layer comprising a material having a refractive index n, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, a ratio $A_r=A2/A1$ of an area A1 of the approximately square region and a surface area A2 of the approximated curved surface of the rough surface is not less than 2−0.5n and not more than 2.5, and absolute value of a numerical value $A_{sk}$ calculated in accordance with the equation (5) by using all the height data of the rough surface is not more than 1.2 is satisfied at substantially any position on the light control film $$A_{sk} = \frac{\sum_{i=1}^{m} z_i^3}{m} \Big/ \sqrt{\frac{\sum_{i=1}^{m} z_i^2}{m}}^3 \quad (5)$$

wherein, in the equation 5, $z_i$ represents a value obtained by subtracting a height of average plane of the rough surface from a measured surface height, and m represents a number of measurement points.

11. A light control film having a rough surface, wherein a condition that, for a curved surface of the rough surface in an approximately square region having an area of 1 mm² or larger defined at an arbitrary position on the rough surface by using height data of the rough surface measured at predetermined intervals in the longitudinal and transverse directions in the approximately square region, a ratio $A_r=A2/A1$ of an area A1 of the approximately square region and a surface area A2 of the approximated curved surface of the rough surface is not less than 1.2 and not more than 2.5, and a numerical value $A_{ku}$ calculated in accordance with the equation 6 by using all the surface height data is not less than 1.5 and not more than 5.0 is satisfied at substantially any position on the light control film $$A_{ku} = \frac{\sum_{i=1}^{m} z_i^4}{m} \Big/ \sqrt{\frac{\sum_{i=1}^{m} z_i^2}{m}}^4 \quad (6)$$

wherein, in the equation 6, $z_i$ represents a value obtained by subtracting a height of average plane of the rough surface from a measured surface height, and m represents a number of measurement points.

12. A light control film having a rough surface formed by a patterned layer comprising a material having a refractive index n, wherein, for a curved surface of the rough surface in an approximately square region having an area of 1 mm² or larger, defined at an arbitrary position on the rough surface, by using height data of the rough surface measured at predetermined intervals in the longitudinal and transverse directions in the approximately square region, a ratio of an area of the approximately square region (A1) and a surface area of the approximated curved surface of the rough surface (A2) ($A_r$=A2/A1) is not less than (2 −0.5n) and not more than 2.5, and a numerical value $A_{ku}$ calculated in accordance with the equation (6) by using all the surface height data is not less than 1.5 and not more than 5.0 at substantially any position on the light control film $$A_{ku} = \frac{\sum_{i=1}^{m} z_i^4}{m} \Big/ \sqrt{\frac{\sum_{i=1}^{m} z_i^2}{m}}^4 , \qquad (6)$$

wherein, in the equation 6, $z_i$ represents a value obtained by subtracting a height of average plane of the rough surface from a measured surface height, and m represents a number of measurement points.

13. The light control film according to claim 1, wherein absolute value of average $\phi_{ave}$ of angles, wherein $\phi$ satisfies the inequality −180 degrees<$\phi$ 180 degrees, between orthogonal projections of normals of the curved surface of the rough surface projected on the base plane and one side of the approximately square region, is not more than 5 degrees irrespective of the direction along which the approximately square region is defined in the rough surface.

14. A backlight unit comprising a light guide plate equipped with a light source on at least one end portion thereof and having a light emergent surface approximately perpendicular to the end portion and a light control film provided on the light emergent surface of the light guide plate, wherein the light control film according to claim 1 is used as the light control film.

15. The backlight unit according to claim 14, wherein a prism sheet is used between the light control film and the light guide plate.

16. A backlight unit comprising a light source, a light diffusive plate provided on one side of the light source and a light control film provided on the side of the light diffusive plate opposite to the light source side, wherein the light control film according to claim 1 is used as the light control film.

* * * * *